United States Patent
Isono

(10) Patent No.: US 11,572,940 B2
(45) Date of Patent: Feb. 7, 2023

(54) VEHICULAR DIFFERENTIAL DEVICE

(71) Applicant: TOYOTA JIDOSHA KABUSHIKI KAISHA, Toyota (JP)

(72) Inventor: Hiroshi Isono, Sunto-gun (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/551,262

(22) Filed: Dec. 15, 2021

(65) Prior Publication Data
US 2022/0243796 A1  Aug. 4, 2022

(30) Foreign Application Priority Data
Feb. 2, 2021 (JP) .............................. JP2021-015010

(51) Int. Cl.
| | | |
|---|---|---|
| *F16H 48/10* | (2012.01) | |
| *F16H 48/11* | (2012.01) | |
| *F16H 48/40* | (2012.01) | |
| *F16H 48/28* | (2012.01) | |

(52) U.S. Cl.
CPC .............. *F16H 48/11* (2013.01); *F16H 48/28* (2013.01); *F16H 48/40* (2013.01); *F16H 2048/106* (2013.01)

(58) Field of Classification Search
CPC .......... F16H 48/11; F16H 48/28; F16H 48/40; F16H 2048/106; F16H 48/32; F16H 48/34; F16H 48/22
See application file for complete search history.

(56) References Cited

U.S. PATENT DOCUMENTS

| | | | | |
|---|---|---|---|---|
| 4,215,593 A | * | 8/1980 | Shono ................ | B60K 17/3462 475/221 |
| 5,868,642 A | * | 2/1999 | Kobayashi ......... | B60K 17/3462 475/203 |
| 5,951,430 A | * | 9/1999 | Kobayashi ............ | F16H 48/285 475/221 |
| 6,056,660 A | * | 5/2000 | Mimura ................ | B60K 17/16 475/205 |
| 2018/0372202 A1 | | 12/2018 | Nishiji et al. | |
| 2019/0072167 A1 | * | 3/2019 | Yamamura .......... | F16H 37/0813 |

FOREIGN PATENT DOCUMENTS

| | | | |
|---|---|---|---|
| FR | 368794 A | * | 12/1906 |
| GB | 115042 A | * | 8/1918 |
| GB | 471325 A | * | 9/1937 |
| GB | 497028 A | * | 12/1938 |
| JP | 2019-007505 A | | 1/2019 |
| WO | WO-9200474 A1 | * | 1/1992 |

\* cited by examiner

*Primary Examiner* — Sherry L Estremsky
(74) *Attorney, Agent, or Firm* — Oliff PLC

(57) ABSTRACT

A vehicular differential device includes a differential rotation mechanism, and a torque input member that receives drive torque, the drive torque is distributed and transmitted to a first drive shaft and a second drive shaft. The differential rotation mechanism includes an input gear that rotates as a unit with the torque input member, an output gear that rotates as a unit with the first drive shaft, a first gear and a second gear that rotate as a unit, and a carrier that supports the first gear and the second gear, the carrier being configured to rotate as a unit with the second drive shaft. The gear ratio between the input gear and the first gear is different from that between the output gear and the second gear. During differential rotation, the first drive shaft and the second drive shaft are rotated in opposite directions.

15 Claims, 13 Drawing Sheets

VEHICULAR DIFFERENTIAL DEVICE

CROSS-REFERENCE TO RELATED APPLICATION

This application claims priority to Japanese Patent Application No. 2021-015010 filed on Feb. 2, 2021, incorporated herein by reference in its entirety.

BACKGROUND

1. Technical Field

The disclosure relates to a vehicular differential device that permits differential rotation of two drive shafts, such as right and left drive shafts of a vehicle, or front and rear propeller shafts of a four-wheel-drive vehicle, which are disposed on the same axis, and distributes torque to the drive shafts.

2. Description of Related Art

One example of a differential device described in Japanese Unexamined Patent Application Publication No. 2019-7505 (JP 2019-7505 A) has been developed so as to curb increase of the number of processing steps, and reduce the size of the device. The differential device described in JP 2019-7505 A includes a first side gear and a second side gear that are arranged side by side in the direction of the rotation axis, sets of two or more pinions that mesh with each other, and a housing that holds the pinions. The first side gear and the second side gear are connected via the sets of pinions such that differential rotation of the first and second side gears is permitted. The set of pinions has a first pinion that meshes with the first side gear, and two or more second pinions that mesh with the second side gear. The first pinion and the two or more second pinions are arranged in parallel with each other, and are held in the housing. The first pinion has a first gear portion that meshes with the first side gear, and a second gear portion that meshes with the two or more second pinions. The first gear portion is formed on one end portion of the first pinion as viewed in the direction of the rotation axis, and the second gear portion is formed on the other end portion of the first pinion as viewed in the direction of the rotation axis. The two or more second pinions are located at positions that are spaced from each other in the circumferential direction of the second side gear, and respectively mesh with the second side gear. The second gear portion of the first pinion meshes with the two or more second pinions, at positions radially outward of the second side gear.

SUMMARY

The differential device described in JP 2019-7505 A is installed on a vehicle, as a device that permits differential rotation and distributes torque, between the right and left drive shafts, or between the front and rear propeller shafts in a four-wheel-drive vehicle. To facilitate installation on the vehicle, it is desirable to minimize the physical size of the device. In the differential device described in JP 2019-7505 A, the first pinion and the second pinions mesh with each other at the radially outer side of the second side gear; therefore, the size of the device as measured in the direction of the rotation axis can be reduced, as compared with the case where two pinions mesh with each other, at the outer side of a side gear as viewed in the direction of the rotation axis, as in the related art. In the differential device described in JP 2019-7505 A, three sets of pinions each of which is a combination of three pinions are arranged in the circumferential direction of the first side gear and second side gear. Accordingly, the differential device described in JP 2019-7505 A uses a total of 11 gears, namely, nine pinions and two side gears. Thus, the differential device described in JP 2019-7505 A requires use of a large number of gears, though the device size as measured in the direction of the rotation axis can be reduced as described above. As a result, the number of components and the number of assembling steps are increased, resulting in increase of the cost. Also, since a large number of pinions are placed on the radially outer side of the side gear, it is not easy to reduce the device size as measured in the radial directions. Consequently, the physical size of the device as a whole may not be sufficiently reduced.

This disclosure provides a vehicular differential device that has a compact and simple structure, and can be easily installed on a vehicle.

According to one aspect of the disclosure, a vehicular differential device is provided which includes a first drive shaft and a second drive shaft that are disposed on a same rotation axis, and are rotatable relative to each other, a differential rotation mechanism configured to permit differential rotation of the first drive shaft and the second drive shaft, and a torque input member disposed on the rotation axis and configured to receive drive torque from a given power source. In the vehicular differential device, the drive torque is distributed and transmitted to the first drive shaft and the second drive shaft. The differential rotation mechanism includes an input gear that is disposed on the rotation axis, and rotates as a unit with the torque input member, an output gear that is disposed on the rotation axis, and rotates as a unit with the first drive shaft, a first gear and a second gear that are disposed on a same axis, and rotate as a unit, and a carrier that is disposed on the rotation axis, and supports the first gear and the second gear such that the first gear and the second gear are rotatable about the axis of the first gear and the second gear and are revolvable about the rotation axis. The carrier rotates as a unit with the second drive shaft. The input gear and the first gear mesh with each other, and the output gear and the second gear mesh with each other. The gear ratio (first gear ratio) between the input gear and the first gear is different from the gear ratio (second gear ratio) between the output gear and the second gear. When the rotational speed of the first drive shaft is equal to the rotational speed of the second drive shaft, the drive torque is equally transmitted to the first drive shaft and the second drive shaft (namely, the first drive shaft and the second drive shaft are rotated as a unit). When the first drive shaft and the second drive shaft perform differential rotation, the first drive shaft and the second drive shaft are rotated relative to each other in opposite directions.

According to the disclosure, where $z_1$ denotes the number of teeth of the first gear, $z_2$ denotes the number of teeth of the second gear, $z_3$ denotes the number of teeth of the input gear, and $z_4$ denotes the number of teeth of the output gear, a relationship that $1/(1-z_3/z_1 \times z_2/z_4) = -1$ may be satisfied.

According to the disclosure, where $z_1$ denotes the number of teeth of the first gear, $z_2$ denotes the number of teeth of the second gear, $z_3$ denotes the number of teeth of the input gear, and $z_4$ denotes the number of teeth of the output gear, a relationship that $-2 < 1/(1-z_3/z_1 \times z_2/z_4) < -1$ may be satisfied.

The input gear in the disclosure may be a first sun gear that is an externally toothed gear, the output gear may be a second sun gear that is an externally toothed gear, the first gear may be a first pinion (planetary gear) that revolves along an outer periphery of the first sun gear while meshing with the first sun gear, and the second gear may be a second pinion (planetary gear) that revolves along an outer periphery of the second sun gear while meshing with the second sun gear.

The outside diameter of the first sun gear in the disclosure may be larger than the outside diameter of the second sun gear.

In the present disclosure, at least one gear pair of a first gear pair of the first sun gear and the first pinion, and a second gear pair of the second sun gear and the second pinion, may include a pair of helical gears.

The input gear in the disclosure may be a first ring gear that is an internally toothed gear, the output gear may be a second ring gear that is an internally toothed gear, the first gear may be a first pinion (planetary gear) that is an externally toothed gear that revolves along an inner periphery of the first ring gear while meshing with the first ring gear, and the second gear may be a second pinion (planetary gear) that is an externally toothed gear that revolves along an inner periphery of the second ring gear while meshing with the second ring gear.

The input gear in the disclosure may be an input ring gear that is an internally toothed gear, the output gear may be an output sun gear that is an externally toothed gear, the first gear may be a first planetary gear that is an externally toothed gear that revolves along an inner periphery of the input ring gear while meshing with the input ring gear, the second gear may be a second planetary gear that is an internally toothed gear that revolves along an outer periphery of the output sun gear while meshing with the output sun gear, and the first planetary gear and the second planetary gear may be formed as a unit.

The vehicular differential device of the disclosure may be installed on a vehicle having right and left drive wheels arranged in a vehicle width direction. The first drive shaft may transmit torque between one of the right and left drive wheels, and the output gear, and the second drive shaft may transmit torque between the other of the right and left drive wheels, and the carrier. The first drive shaft and the second drive shaft may be disposed to be opposed to each other in the vehicle width direction.

The vehicular differential device of the disclosure may be installed on a four-wheel-drive vehicle having front and rear drive wheels arranged in an overall length direction. The first drive shaft may transmit torque between one of the front and rear drive wheels and the output gear, and the second drive shaft may transmit torque between the other of the front and rear drive wheels and the carrier. The first drive shaft and the second drive shaft may be disposed to be opposed to each other in the overall length direction.

The vehicular differential device of the disclosure may further include a control actuator that generates control torque that is different from the drive torque. The control actuator may be connected to the torque input member and the second drive shaft such that power is transmittable between the control actuator, and the torque input member and the second drive shaft. The differential rotation mechanism may rotate the first gear and the second gear relative to each other in opposite directions when the control torque is applied (input) to the second drive shaft, and the distribution (distribution ratio) of the drive torque transmitted from the torque input member to the first drive shaft and the drive torque transmitted from the torque input member to the second drive shaft may be controlled (namely, torque vectoring may be performed between the first drive shaft and the second drive shaft) by controlling the control torque.

According to the disclosure, the control actuator may be a control motor, or an electromagnetic brake of excitation operation type, or an electric brake.

The vehicular differential device of the disclosure may further include a speed reduction mechanism for control provided between the control actuator, and the differential rotation mechanism and the second drive shaft. The speed reduction mechanism for control may include a sun gear connected to the differential rotation mechanism, via the torque input member; a planetary gear that revolves about the rotation axis, while meshing with the sun gear; a revolution support carrier that supports revolving motion of the planetary gear; and an output plate that rotates as a unit with the second drive shaft, and converts the revolving motion of the planetary gear into rotary motion of the second drive shaft. The control torque may be applied from the control actuator to the revolution support carrier, and the speed reduction ratio of an inscribed planetary gear mechanism including the sun gear and the planetary gear may be equal to the number of teeth of the planetary gear.

The vehicular differential device of the disclosure may further include a speed reduction mechanism for control provided between the control actuator, and the differential rotation mechanism and the second drive shaft. The speed reduction mechanism for control may include a first sun gear that rotates as a unit with the torque input member; a second sun gear that is disposed on the rotation axis, and rotates as a unit with the second drive shaft; a first pinion that meshes with the first sun gear; a second pinion that meshes with the second sun gear; and a carrier that is disposed on the rotation axis, and supports the first pinion and the second pinion, such that the first pinion and the second pinion are respectively rotatable about axes of the first pinion and the second pinion and are revolvable about the rotation axis. The first sun gear and the second sun gear may rotate relative to each other. The first pinion and the second pinion may rotate as a unit in a self-rotating direction. The carrier may be configured to receive control torque of the control motor, via a speed reducing planetary gear mechanism. The gear ratio of a gear pair of the first sun gear and the first pinion may be different from the gear ratio of a gear pair of the second sun gear and the second pinion.

The vehicular differential device of the disclosure may further include a speed increasing planetary gear mechanism having a speed increasing sun gear, a speed increasing carrier, and a speed increasing ring gear, and a speed reducing planetary gear mechanism having a speed reducing sun gear, a speed reducing carrier, and a speed reducing ring gear. The speed increasing planetary gear mechanism and the speed reducing planetary gear mechanism may be disposed on the rotation axis. The speed increasing sun gear may be irrotatably fixed. The speed increasing carrier may rotate as a unit with the torque input member (and the input gear). The rotational speed of the speed increasing ring gear may increase relative to the rotational speed of the speed increasing carrier, when the speed increasing carrier rotates. The speed reducing ring gear may be connected to the speed increasing ring gear, and rotate as a unit with the speed increasing ring gear. The rotational speed of the speed reducing carrier may be reduced relative to the rotational speed of the speed reducing ring gear. The speed reducing sun gear may rotate as a unit with a control torque output shaft through which the control actuator generates the control torque, and the speed reducing sun gear may rotate relative to the torque input member (namely, does not corotate with the torque input member) when the first drive shaft and the second drive shaft rotate at equal speed in a same direction to corotate with the torque input member.

The vehicular differential device of the disclosure may be installed on a vehicle having right and left drive wheels arranged in a vehicle width direction, along with a drive motor that generates the drive torque as the given power source, and the first drive shaft and the second drive shaft may be disposed to be opposed to each other in the vehicle width direction. The vehicular differential device may further include a first speed reduction mechanism that is disposed between the first drive shaft, and a first axle to which one of the right and left drive wheels is connected, and is configured to amplify torque of the first drive shaft, and transmit the torque to the first axle, and a second speed reduction mechanism that is disposed between the second drive shaft, and a second axle to which the other of the right and left drive wheels is connected, and is configured to amplify torque of the second drive shaft, and transmit the torque to the second axle. The differential rotation mechanism, the drive motor, the first speed reduction mechanism, and the second speed reduction mechanism may be disposed on the rotation axis.

The drive motor of the disclosure may have a rotor having a hollow structure, and the differential rotation mechanism may be placed in a hollow portion of the rotor (namely, may be incorporated in the drive motor).

The vehicular differential device of the disclosure principally includes two gears, i.e., an input gear and an output gear, two other gears, i.e., a first gear and a second gear that respectively mesh with the above two gears, and a carrier that supports the first gear and the second gear such that they can rotate about the axis of the first gear and the second gear, and can revolve about the rotation axis. Thus, a principal gear transmission portion of the vehicular differential device of the disclosure includes four types of gears in total, and the carrier. The first gear and the second gear revolve about the rotation axis, while meshing with the input gear and the output gear, respectively. Namely, the first gear and the second gear are so-called planetary gears of planetary gear mechanisms. In sum, the vehicular differential device of this disclosure substantially includes two sets of planetary gear mechanisms that share the carrier. For example, the vehicular differential device includes two sets of planetary gear mechanisms that use no ring gears, or two sets of planetary gear mechanisms that use no sun gears, or two sets of planetary gear mechanisms that use no pinions. The planetary gear mechanism used in the vehicular differential device has a simpler structure, as compared with a general planetary gear mechanism that consists of a sun gear, a ring gear, and pinions.

Further, in the vehicular differential device of this disclosure, the gear ratio (which will be called "first gear ratio") between the input gear and the first gear is set to be different from the gear ratio (which will be called "second gear ratio") between the output gear and the second gear. Therefore, in a condition where the rotational speed of the input gear connected to the torque input member is equal to the rotational speed of the output gear connected to the first drive shaft, when torque is transmitted between the input gear and the first gear, and between the output gear and the second gear, respectively, the meshing of gears on the input gear side and the meshing of gears on the output gear side, interfere with each other. As a result, the differential rotation mechanism is placed in a substantially engaged state, and rotates as a unit. Therefore, the input gear, output gear, and carrier rotate as a unit, without performing differential rotation. Consequently, the first drive shaft and the second drive shaft do not rotate differentially, but rotate at equal speed. On the other hand, when there is a difference between the rotational speed of the input gear and the rotational speed of the output gear, the above-described engaged state established due to the interference between the gears on the input gear side and the gears on the output gear side is eliminated, and the differential rotation mechanism transmits torque according to the "first gear ratio" and the "second gear ratio", respectively. Therefore, the input gear and the output gear respectively rotate, so that the output gear rotates in the reverse direction relative to the input gear. Further, the output gear and the carrier rotate in opposite directions. As a result, the first drive shaft and the second drive shaft respectively rotate, such that one of the drive shafts rotates in the reverse direction with respect to the other drive shaft. Namely, the first drive shaft and the second drive shaft rotate relative to each other in the opposite rotational directions, while rotating differentially. Therefore, the drive torque applied from a power source to the torque input member is distributed to the first drive shaft and the second drive shaft. At the same time, a difference in the rotational speed between the first drive shaft and the second drive shaft is absorbed. Thus, according to this disclosure, the vehicular differential device that is compact in size and simple in structure can be constructed, by using the two sets of simple planetary gear mechanisms (differential rotation mechanism) as described above.

In the vehicular differential device of this disclosure, where $z_1$ denotes the number of teeth of the first gear, $z_2$ denotes the number of teeth of the second gear, $z_3$ denotes the number of teeth of the input gear, and $z_4$ denotes the number of teeth of the output gear, the number of teeth $z_1$ of the first gear, the number of teeth $z_2$ of the second gear, the number of teeth $z_3$ of the input gear, and the number of teeth $z_4$ of the output gear may be respectively set, so that the relationship that $1/(1-z_3/z_1 \times z_2/z_4)=-1$ is satisfied. The term "$1/(1-z_3/z_1 \times z_2/z_4)$" in the expression of the relationship concerning the number of teeth of each gear is the reciprocal of the ratio of the rotational speed of the input gear to the rotational speed of the carrier, and is the speed reduction ratio of the differential rotation mechanism that takes account of the rotational direction (the negative sign given to the speed reduction ratio means that the rotational direction of the carrier is reverse to that of the input gear). Therefore, when the speed reduction ratio of the differential rotation mechanism is "−1", and the first drive shaft and the second drive shaft rotate differentially, the first drive shaft and the second drive shaft rotate relative to each other at equal rotational speed, in the opposite directions. Accordingly, with the vehicular differential device of the disclosure, it is possible to equally distribute and transmit drive torque applied to the torque input member, to the first drive shaft and the second drive shaft, while permitting differential rotation between the first drive shaft and the second drive shaft.

Also, in the vehicular differential device of the disclosure, where $z_1$ denotes the number of teeth of the first gear, $z_2$ denotes the number of teeth of the second gear, $z_3$ denotes the number of teeth of the input gear, and $z_4$ denotes the number of teeth of the output gear, the number of teeth $z_1$ of the first gear, the number of teeth $z_2$ of the second gear, the number of teeth $z_3$ of the input gear, and the number of teeth $z_4$ of the output gear may be respectively set, so that the relationship that $-2<1/(1-z_3/z_1 \times z_2/z_4)<-1$ is satisfied. In the case of a differential rotation mechanism using a general planetary gear mechanism, the magnitude (absolute value)

of the speed reduction ratio that can be set is approximately "3" at a minimum. On the other hand, with the vehicular differential device of the disclosure, the number of teeth $z_1$ of the first gear, the number of teeth $z_2$ of the second gear, the number of teeth $z_3$ of the input gear, and the number of teeth $z_4$ of the output gear are suitably adjusted and set, so that the speed reduction ratio can be set to within the range of about "1" to "2". Thus, the vehicular differential device having a high degree of freedom in setting of the torque distribution ratio can be constructed.

In the vehicular differential device of the disclosure, two sets of planetary gear mechanisms may be constructed, in which the input gear and the output gear are sun gears (first sun gear and second sun gear) in the form of externally toothed gears, and the first gear and the second gear are planetary gears (first pinion and second pinion) that revolve along the outer peripheries of the input gear and the output gear, respectively. These two sets of planetary gear mechanisms constitute the differential rotation mechanism. In this case, each of the two sets of planetary gear mechanisms has a simple structure using no ring gear. Thus, according to the disclosure, the vehicular differential device that is compact in size and simple in structure can be constructed, by using the two sets of simple planetary gear mechanisms (differential rotation mechanism).

Also, in the vehicular differential device of the disclosure, as mentioned above, when the input gear and the output gear are respectively provided by the first sun gear and the second sun gear in the form of externally toothed gears, the outside diameter of the first sun gear (input gear) may be set to be larger than that of the second sun gear (output gear). Therefore, the diameter of the first sun gear, which is an input element and is required to have a greater strength, can be increased. As a result, sufficient strength of the first sun gear can be assured. Accordingly, the differential rotation mechanism can be designed to be small-sized, and, consequently, the size of the vehicular differential device of the disclosure can be reduced.

In the vehicular differential device of the disclosure, as mentioned above, when the input gear and the output gear are respectively provided by the first sun gear and the second sun gear in the form of externally toothed gears, and the first gear and the second gear are respectively provided by the first pinion and the second pinion in the form of externally toothed gears, at least one gear pair of the gear pair of the first sun gear and the first pinion, and the gear pair of the second sun gear and the second pinion, may be formed by helical gears. With the helical gears thus used, when torque is applied to the pair of gears, thrust force (force that acts in the direction of the rotation axis) commensurate with the torque is generated. Therefore, differential restriction can be imposed on the vehicular differential device, using frictional sliding resistance generated at end faces of the gears in response to the thrust force. Accordingly, the vehicular differential device of the disclosure can possess the differential restricting function of so-called torque sensing type.

Also, in the vehicular differential device of the disclosure, two sets of planetary gear mechanisms may be constructed, in which the input gear and the output gear are respectively provided by ring gears in the form of internally toothed gears, and the first gear and the second gear are respectively provided by planetary gears (pinions) that revolve along the inner peripheries of the input gear and the output gear. Then, the two sets of planetary gear mechanisms constitute the differential rotation mechanism. In this case, each of the two sets of planetary gear mechanisms has a simple structure using no sun gear. Thus, according to the disclosure, the vehicular differential device that is compact in size and simple in structure can be constructed, by using the two sets of simple planetary gear mechanisms (differential rotation mechanism).

Also, in the vehicular differential device of the disclosure, two sets of inscribed planetary gear mechanisms may be constructed, in which the input gear is provided by the ring gear in the form of the internally toothed gear, and the output gear is provided by the sun gear in the form of the externally toothed gear, while the first gear is provided by the planetary gear that revolves along the inner periphery of the input gear, and the second gear is provided by the planetary gear that revolves along the outer periphery of the output gear. Then, the two sets of inscribed planetary gear mechanisms constitute the differential rotation mechanism. The inscribed planetary gear mechanism has a simple structure using no pinions. Thus, according to the disclosure, the vehicular differential device that is compact in size, and simple in structure can be constructed, by using the two sets of simple inscribed planetary gear mechanisms (differential rotation mechanism).

Also, in the vehicular differential device of the disclosure, the first drive shaft and the second drive shaft may be laterally arranged side by side in the vehicle width direction. Thus, the first drive shaft and the second drive shaft are used as axles that transmit torque to the drive wheels, or the first drive shaft and the second drive shaft are connected to the axles of the right and left drive wheels, to provide the differential device for the right and left drive wheels of the vehicle. Accordingly, the vehicular differential device of the disclosure can provide a differential device for the right and left drive wheels, which is compact in size and simple in structure, and can be easily installed on the vehicle.

Also, in the vehicular differential device of the disclosure, the first drive shaft and the second drive shaft may be longitudinally arranged side by side in the overall length direction (or longitudinal direction) of the vehicle. Therefore, the first drive shaft and the second drive shaft are used as propulsion shafts that transmit torque to the drive wheels, to provide a so-called center differential of a four-wheel-drive vehicle. Thus, the vehicular differential device of the disclosure can provide the center differential for the front and rear drive wheels, which is compact in size and simple in structure, and can be easily installed on the four-wheel-drive vehicle.

The vehicular differential device of the disclosure may be combined with the control actuator, to provide a torque vectoring device. By transmitting control torque generated by the control actuator, to the torque input member, it is possible to distribute and transmit the control torque to the output gear, i.e., the first drive shaft, and the carrier, i.e., the second drive shaft. The control torque transmitted to the output gear and the carrier causes the output gear and the carrier to rotate in opposite directions. Accordingly, through control of the control torque of the control actuator, the distribution or distribution ratio of the drive torque transmitted from the power source to the first drive shaft and the drive torque transmitted from the power source to the second shaft can be positively controlled. Namely, torque vectoring can be performed on the right and left drive wheels, or the front and rear drive wheels, for example. Accordingly, with the vehicular differential device of the disclosure, the torque vectoring device that is compact in size and simple in structure can be constructed.

When the vehicular differential device of the disclosure is combined with the control actuator, to provide the torque vectoring device, as described above, the speed increasing planetary gear mechanism and speed reducing planetary gear mechanism may be provided for curbing so-called co-rotation of the control actuator. In the vehicular differential device of the disclosure, when the input gear and the output gear rotate at equal speed in the same direction, the first gear, second gear, and carrier, in addition to/instead of the input gear and output gear, rotate as a unit. Namely, the differential rotation mechanism rotates as a unit. At the same time, the speed increasing carrier of the speed increasing planetary gear mechanism and the speed reducing carrier of the speed reducing planetary gear mechanism rotate at equal speed in the same direction. In this case, the speed increasing planetary mechanism functions as a speed increasing mechanism that increases the rotational speed of the speed increasing ring gear relative to the rotational speed of the speed increasing carrier, in a condition where rotation of the speed increasing sun gear is stopped. On the other hand, the speed reducing planetary gear mechanism functions as a speed reducing mechanism that reduces the rotational speed of the speed reducing carrier relative to that of the speed reducing ring gear. The rotational speed of the speed increasing carrier is equal to that of the speed reducing carrier. Also, the speed increasing ring gear and the speed reducing ring gear are connected to each other, so that the rotational speed of the speed increasing ring gear is equal to that of the speed reducing ring gear. Therefore, the absolute value of the speed increase ratio of the speed increasing planetary gear mechanism is equal to the absolute value of the speed reduction ratio of the speed reducing planetary gear mechanism. In this case, since the rotational speed of the speed increasing sun gear of the speed increasing planetary gear mechanism is equal to "0", the rotational speed of the speed reducing sun gear of the speed reducing planetary gear mechanism is reduced to "0" or a rotational speed around "0", relative to the rotational speed of the speed reducing ring gear or the speed reducing carrier, according to the gear ratio of the speed reducing planetary gear mechanism. In this case, the gear ratio of the speed increasing planetary gear mechanism and the gear ratio of the speed reducing planetary gear mechanism are set to be equal to each other, so that the rotational speed of the speed reducing sun gear can be made equal to zero. Accordingly, when the input gear and the output gear rotate at equal speed in the same direction as mentioned above, and the differential rotation mechanism co-rotates as a unit, the rotational speed of the control torque output shaft connected to the speed reducing sun gear can be made equal to zero, or substantially equal to zero. Namely, co-rotation of the control actuator can be curved or prevented. Accordingly, with the vehicular differential device of the disclosure, it is possible to curb co-rotation of the control actuator, and improve the power transmission efficiency of the vehicular differential device. Consequently, the energy efficiency of the vehicle on which the vehicular differential device of the disclosure is installed, along with the control actuator, can be improved.

The vehicular differential device of the disclosure may be combined with the drive motor, and the first speed reduction mechanism and the second speed reduction mechanism, to provide a power unit that serves as a drive power source of the vehicle. In this aspect, the vehicular differential device, drive motor, first speed reduction mechanism, and second speed reduction mechanism are all disposed on the same rotation axis. Therefore, the power unit having a uniaxial structure, in which the vehicular differential device of the disclosure is incorporated, is constructed. At this time, the vehicular differential device is disposed upstream of each speed reduction mechanism. Namely, the vehicular differential device is placed between the drive motor, and the first speed reduction mechanism and second speed reduction mechanism. As a result, drive torque that has not been amplified by the first speed reduction mechanism and the second speed reduction mechanism is applied to the vehicular differential device. Therefore, the size of the vehicular differential device is less likely or unlikely to be increased. Accordingly, with the vehicular differential device of the disclosure, the power unit of the uniaxial structure, which is compact in size and simple in structure, can be constructed.

When the vehicular differential device of the disclosure cooperates with the drive motor, and the first speed reduction mechanism and second speed reduction mechanism as mentioned above, to provide the power unit having the uniaxial structure, the drive motor with a rotor having a hollow structure may be used. Then, the differential rotation mechanism is placed in a hollow portion of the rotor. Namely, the differential rotation mechanism is incorporated in the rotor of the drive motor. Therefore, the overall length of the power unit as measured in the direction of the rotation axis can be shortened, as compared with the arrangement in which the drive motor and the differential rotation mechanism are arranged in series in the direction of the rotation axis. Accordingly, with the vehicular differential device of the disclosure, the power unit that is further compact in size and further simple in structure, and has the reduced overall length in the direction of the rotation axis, can be constructed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Some embodiments of this disclosure will be described with reference to the drawings. The embodiments indicated below are mere examples where the disclosure is embodied, and are not intended to limit the disclosure.

Figure 1:
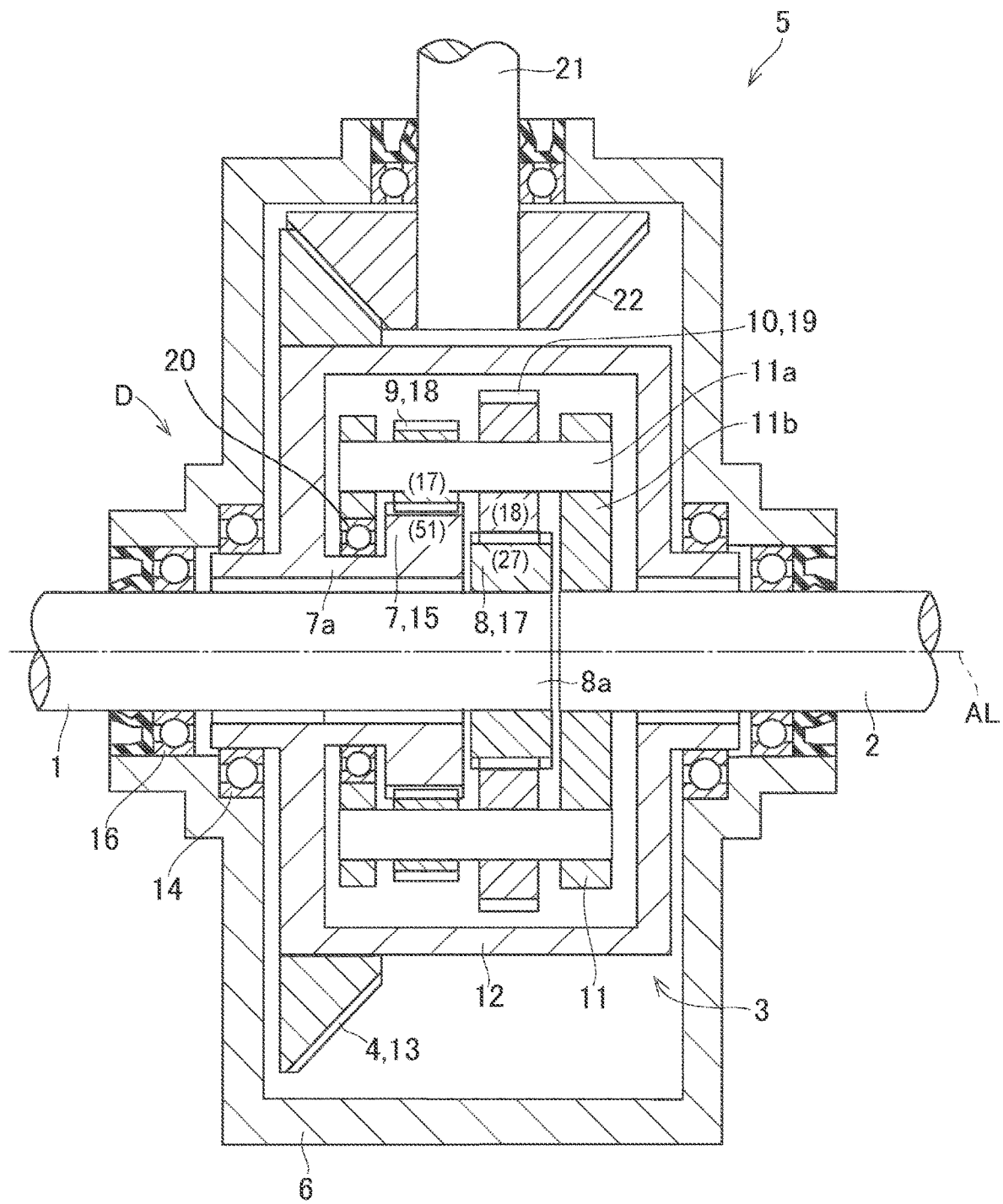
FIG. 1 is a view illustrating one example of a vehicular differential device of this disclosure, and showing an embodiment in which the vehicular differential device is of a type in which two sets of planetary gear mechanisms each including a sun gear and pinions constitute a "differential rotation mechanism", to provide an "open differential"

One example of a vehicular differential device to which the disclosure is applied is illustrated in FIG. 1. A differential device D according to one embodiment of the disclosure is a power transmission device configured to rotate two drive shafts disposed on the same axis in opposite directions to permit differential rotation, and includes two main rotary shafts, i.e., a first drive shaft 1 and a second drive shaft 2, a differential rotation mechanism 3, and a torque input member 4. The differential device D shown in FIG. 1 is installed on a vehicle (not shown), and constitutes a differential mechanism 5 (so-called "open differential") for right and left drive wheels (not shown) of the vehicle.

The first drive shaft 1 and the second drive shaft 2 are disposed on the same axis to be opposed to each other, such that they can rotate relative to each other. More specifically, the first drive shaft 1 and the second drive shaft 2 are both disposed on a rotation axis AL. The first drive shaft 1 and the second drive shaft 2 are rotatably supported by a case 6 of the differential device D, via respective bearings. The case 6 also serves as a case of the differential mechanism 5, or is integrated with a case of the differential mechanism 5. In the embodiment shown in FIG. 1, one end (a right end portion in FIG. 1) of the first drive shaft 1 is rotatably supported by the case 6. One of the right and left drive wheels (not shown) of the vehicle is connected to a protruding distal end (a left end portion in FIG. 1) of the first drive shaft 1. Similarly, one end (a left end portion in FIG. 1) of the second drive shaft 2 is rotatably supported by the case 6. The other drive wheel (not shown) is connected to a protruding distal end (a right end portion in FIG. 1) of the second drive shaft 2.

The differential rotation mechanism 3 is disposed on the rotation axis AL. The differential rotation mechanism 3 permits differential rotation between the first drive shaft 1 and the second drive shaft 2. The differential rotation mechanism 3 principally includes an input gear 7, output gear 8, first gears 9, second gears 10, and carrier 11, as main constituent elements.

The input gear 7 and the output gear 8 are disposed in series (namely, arranged side by side in the direction of the rotation axis AL) on the same rotation axis AL. In the embodiment shown in FIG. 1, the input gear 7 and the output gear 8 are arranged in this order, as viewed from the left in FIG. 1. The input gear 7 and the output gear 8 can rotate relative to each other. In the embodiment shown in FIG. 1, the input gear 7 has a rotary shaft 7a in the form of a hollow shaft, and a rotary shaft 8a of the output gear 8 and the first drive shaft 1 are placed in a hollow portion of the rotary shaft 7a. As will be described later, the rotary shaft 8a and the first drive shaft 1 rotate as a unit. The rotary shaft 7a can rotate relative to the rotary shaft 8a and the first drive shaft 1. Thus, the input gear 7 and the output gear 8 rotate relative to each other.

The rotary shaft 7a of the input gear 7 is connected to a differential ring gear 13, via a differential case 12. The differential case 12 is a housing-like rotary member that covers the differential rotation mechanism 3. The differential case 12 is disposed on the rotation axis AL. As described later, the differential ring gear 13 is a rotary member corresponding to the torque input member 4 of the embodiment of the disclosure. The differential ring gear 13 is formed on the outer periphery of the differential case 12. The differential case 12 and the differential ring gear 13 rotate as a unit. Accordingly, the input gear 7, and the differential ring gear 13 i.e., the torque input member 4, rotate as a unit. The input gear 7, differential case 12, and differential ring gear 13 are supported by the case 6, via a bearing 14. In the embodiment shown in FIG. 1, the input gear 7 is a first sun gear 15 in the form of an "externally toothed gear", and meshes with the first gears 9 (i.e., first pinions 18 that will be described later).

The rotary shaft 8a of the output gear 8 is connected to the first drive shaft 1, or is formed integrally with the first drive shaft 1. The rotary shaft 8a and the first drive shaft 1 rotate as a unit. Accordingly, the output gear 8 and the first drive shaft 1 rotate as a unit. The output gear 8 and the first drive shaft 1 are supported by the case 6, via a bearing 16. In the embodiment shown in FIG. 1, the output gear 8 is a second sun gear 17 in the form of an "externally toothed gear", and meshes with the second gears 10 (i.e., second pinions 19 that will be described later).

The first gears 9 and the second gears 10 are disposed in series on the same axis (namely, are arranged side by side in the direction of the rotation axis AL). In the embodiment shown in FIG. 1, the first gears 9 and the second gears 10 are arranged in this order, as viewed from the left in FIG. 1. The first gears 9 and the second gears 10 rotate as a unit. As will be described later, the first gears 9 and the second gears 10 are supported by the carrier 11 such that they can rotate about the axis thereof, and can revolve about the rotation axis AL. In the embodiment shown in FIG. 1, the first gears 9 is the first pinions 18 in the form of a small-diameter "externally toothed gear", and meshes with the input gear 7, or the first sun gear 15. The second gear 10 is the second pinion 19 in the form of a small-diameter "externally toothed gear", and meshes with the output gear 8, or the second sun gear 17.

The carrier 11 is disposed on the rotation axis AL. The carrier 11 is supported by the rotary shaft 7a of the input gear 7 (the first sun gear 15), via a bearing 20. The carrier 11 and the rotary shaft 7a can rotate relative to each other. Accordingly, the carrier 11, and the input gear 7 (the first sun gear 15) and the output gear 8 (the second sun gear 17), rotate relative to each other. The carrier 11 supports the first pinions 18 and the second pinions 19 such that the first and second pinions 18, 19 can rotate about the axis thereof, and can revolve about the rotation axis AL. More specifically, in the embodiment shown in FIG. 1, the carrier 11 has pinion shafts 11a and a plate portion 11b. The first pinion 18 and the second pinion 19 are integrally mounted on the corresponding pinion shaft 11a. The pinion shaft 11a, first pinion 18, and second pinion 19 rotate as a unit. The plate portion 11b rotatably supports the pinion shafts 11a. The plate portion 11b is connected to the second drive shaft 2. The plate portion 11b and the second drive shaft 2 rotate as a unit. Accordingly, the carrier 11 and the second drive shaft 2 rotate as a unit.

Two or more sets (which will be referred to as "planetary sets") of the first pinion 18, second pinion 19, and pinion shaft 11a supported by the carrier 11 are provided on the orbital path (circular orbit) of the "planetary sets". In FIG. 1, two "planetary sets" are located to be opposed to each other in a radial direction of the orbital path.

The torque input member 4 receives drive torque from a power source. In the embodiment shown in FIG. 1, the differential ring gear 13 is provided as the torque input member 4. The power source is, for example, an engine or a drive motor, or a brake device, and generates positive or negative drive torque, such as torque that accelerates the vehicle, or torque that brakes the vehicle.

In the embodiment shown in FIG. 1, the differential ring gear 13 is a large-diameter bevel gear, and meshes with a drive pinion 22 provided at a distal end of a propeller shaft 21 (a lower end portion of the propeller shaft 21 in FIG. 1) of a vehicle (not shown). The drive pinion 22 is a bevel gear that has a smaller diameter and a smaller number of teeth than those of the differential ring gear 13. Thus, the drive pinion 22 and the differential ring gear 13 constitute a final reduction gear (final gear) of the vehicle. The other end portion (not shown) of the propeller shaft 21 is connected to the power source of the vehicle. Namely, the differential rotation mechanism 3 is connected to the power source, via the differential ring gear 13 and the propeller shaft 21.

As described above, the differential device D according to the embodiment of the disclosure principally includes the first drive shaft 1, second drive shaft 2, differential rotation mechanism 3, and torque input member 4. In the embodiment shown in FIG. 1, the differential device D provides the differential mechanism 5 (open differential) for the right and left drive wheels of the vehicle. The differential rotation mechanism 3 as a main constituent element of the differential device D principally includes a total of four types of gears, i.e., the input gear 7 (the first sun gear 15), output gear 8 (second sun gear 17), first gears 9 (first pinions 18), and second gears 10 (second pinions 19), and the carrier 11. The first gears 9 and the second gears 10, which mesh with the input gear 7 and the output gear 8, respectively, revolve about the rotation axis AL. Namely, each of the first gears 9 and the second gears 10 is a so-called planetary gear of a planetary gear mechanism. In sum, the differential device D according to the embodiment of the disclosure substantially includes two sets of planetary gear mechanisms that share the carrier 11, or a composite planetary gear mechanism into which two sets of planetary gear mechanisms are combined. In the embodiment shown in FIG. 1, the differential device D is constituted by two sets of planetary gear mechanisms that use no "ring gears". Thus, the planetary gear mechanism used in this embodiment has a simpler structure as compared with a general planetary gear mechanism that includes three rotary elements, i.e., "sun gear", "ring gear", and "pinions".

In the differential device D according to the embodiment of the disclosure, when the first drive shaft 1 and the second drive shaft 2 rotate at equal speed (the same rotational speed) in the same direction, the first drive shaft 1 and second drive shaft 2, and the differential rotation mechanism 3 rotate as a unit. In this case, the drive torque is equally distributed and transmitted to the first drive shaft 1 and the second drive shaft 2. On the other hand, when the rotational speed of the first drive shaft 1 is different from that of the second drive shaft 2, the first drive shaft 1 and the second drive shaft 2 rotate relative to each other in opposite directions, to perform differential rotation.

To this end, in the differential device D, the gear ratio between the input gear 7 and the first gear 9 and the gear ratio between the output gear 8 and the second gear 10 are set to be different from each other. In this embodiment of the disclosure, $z_1$ denotes the number of teeth of the first gear 9, and $z_2$ denotes the number of teeth of the second gear 10, while $z_3$ denotes the number of teeth of the input gear 7, and $z_4$ denotes the number of teeth of the output gear 8. Also, the ratio of the number of teeth $z_1$ of the first gear 9 to the number of teeth $z_3$ of the input gear 7 is denoted as the gear ratio (the first gear ratio) $u_1$ between the first gear 9 and the input gear 7, and the ratio of the number of teeth $z_2$ of the second gear 10 to the number of teeth $z_4$ of the output gear 8 is denoted as the gear ratio (the second gear ratio) $u_2$ between the second gear 10 and the output gear 8.

For example, the differential device D is configured such that the number of teeth $z_1$ of the first gear 9 (the first pinion 18) is "17", and the number of teeth $z_2$ of the second gear 10 (the second pinion 19) is "18", while the number of teeth $z_3$ of the input gear 7 (the first sun gear 15) is "51", and the number of teeth $z_4$ of the output gear 8 (the second sun gear 17) is "27", as indicated by numerical values in parentheses in FIG. 1. In this case, the first gear ratio $u_1$ and the second gear ratio $u_2$ are respectively expressed as follows.

$$u_1 = z_1/z_3 = 17/51 \approx 0.333$$

$$u_2 = z_2/z_4 = 18/27 \approx 0.666$$

The first gear ratio $u_1$ and the second gear ratio $u_2$ are not equal to each other, but are different from each other.

In the differential device D constructed as described above, the drive torque applied to the torque input member 4 (the differential ring gear 13) is distributed and transmitted to the input gear 7 (the first sun gear 15) and the output gear 8 (the second sun gear 17). At this time, when the rotational speed of the first drive shaft 1 and that of the second drive shaft 2 are equal to each other, the output gear 8 (the second sun gear 17) and the carrier 11 rotate as a unit.

More specifically, when the drive torque is applied to the input gear 7 (the first sun gear 15), the first gear 9 (the first pinion 18) and the second gear 10 (the second pinion 19) rotate. At this time, since the first gear ratio $u_1$ between the first gear 9 (the first pinion 18) and the input gear 7 (the first sun gear 15) is smaller than the second gear ratio $u_2$ between the second gear 10 (the second pinion 19) and the output gear 8 (the second sun gear 17), the input gear 7 (the first sun gear 15) tends to rotate at a lower speed than the output gear 8 (the second sun gear 17). On the other hand, the output gear 8 (the second sun gear 17) tends to rotate at a higher speed than the input gear 7 (the first sun gear 15). Therefore, the input gear 7 (the first sun gear 15) and the output gear 8 (the second sun gear 17) tend to rotate relative to each other in opposite directions. Namely, torque is applied in opposite directions to a meshing portion of the first gear 9 (the first pinion 18) and the input gear 7 (the first sun gear 15) and a meshing portion of the second gear 10 (the second pinion 19) and the output gear 8 (the second sun gear 17). However, in fact, the first gear 9 (the first pinion 18) and the second gear 10 (the second pinion 19) rotate as a unit. Therefore, the respective meshing portions interfere with each other. As a result, the differential rotation mechanism 3 of the differential device D as a whole is placed in a substantially engaged state, and rotates as a unit. Namely, the input gear 7 (the first sun gear 15), the output gear 8 (the second sun gear 17), and the carrier 11 are integrated into a unit, and rotate as a unit. Accordingly, the first drive shaft 1 and second drive shaft 2 do not perform differential rotation, but rotate as a unit.

On the other hand, when there is a difference between the rotational speed of the first drive shaft 1 and that of the second drive shaft 2, namely, when the output gear 8 (the second sun gear 17) and the carrier 11 rotate differentially, the substantially engaged state of the differential device D due to the interference of the respective meshing portions is eliminated. Therefore, the drive torque is transmitted via a power transmission path from the torque input member 4 (the differential ring gear 13) to the output gear 8 (the second sun gear 17), and a power transmission path from the torque input member 4 (the differential ring gear 13) to the carrier 11 respectively, while the output gear 8 (the second sun gear 17) and the carrier 11 perform differential rotation. In this case, the output gear 8 (the second sun gear 17) and the carrier 11 rotate differentially, according to the gear ratio (the speed reduction ratio) of the composite planetary gear mechanism that constitutes the differential rotation mechanism 3 as described above.

In the differential device D according to the embodiment of the disclosure, the number of teeth $z_1$ of the first gear 9 (the first pinion 18), the number of teeth $z_2$ of the second gear 10 (the second pinion 19), the number of teeth $z_3$ of the input gear 7 (the first sun gear 15), and the number of teeth $z_4$ of the output gear 8 (the second sun gear 17) are respectively set, so that the following relationship is satisfied.

$$1/(1-z_3/z_1 \times z_2/z_4) = -1$$

Similarly to the above example, where the respective numbers of teeth $z_1, z_2, z_3, z_4$ are the numerical values indicated in parentheses in FIG. 1, $$1/(1-z_3/z_1 \times z_2/z_4) = 1/\{1-(51/17)\times(18/27)\} = -1$$

and the above expression representing the relationship is satisfied.

The term "$1/(1-z_3/z_1 \times z_2/z_4)$" in the above expression is the reciprocal of the ratio of the rotational speed of the input gear 7 (the first sun gear 15) to that of the carrier 11, and represents the speed reduction ratio of the differential rotation mechanism 3 (composite planetary gear mechanism) that takes account of the rotational direction (which means that the rotational direction of the carrier 11 is opposite to that of the input gear 7 (the first sun gear 15) when a negative sign is given to the speed reduction ratio). Thus, since the speed reduction ratio of the differential rotation mechanism 3 is "−1", the carrier 11 rotates at equal speed, in the reverse rotational direction, relative to the input gear 7 (the first sun gear 15) and the output gear 8 (the second sun gear 17), when the first drive shaft 1 and the second drive shaft 2 rotate differentially. Namely, the first drive shaft 1 and the second drive shaft 2 rotate relative to each other at equal rotational speed, in the opposite directions. Accordingly, with the differential device D according to the embodiment of the disclosure, the drive torque applied to the torque input member 4 (the differential ring gear 13) can be equally distributed and transmitted to the first drive shaft 1 and the second drive shaft 2, while the first drive shaft 1 and the second drive shaft 2 are allowed to rotate differentially.

Thus, the differential device D according to the embodiment of the disclosure substantially includes two sets of planetary gear mechanisms, or a composite planetary gear mechanism, as a main portion, and operates to distribute and transmit drive torque received from the power source, to the first drive shaft 1 and the second drive shaft 2. Also, the differential device D permits differential rotation of the first drive shaft 1 and the second drive shaft 2, and absorbs a difference in the rotational speed between the first drive shaft 1 and the second drive shaft 2. Accordingly, the differential device D according to the embodiment of the disclosure provides the differential mechanism 5 (open differential) that is compact in size and simple in structure.

In the differential device D according to the embodiment of the disclosure, when the input gear 7 and the output gear 8 are respectively provided by the first sun gear 15 and the second sun gear 17 in the form of "externally toothed gears", as shown in FIG. 1, the outside diameters of the first sun gear 15 and second sun gear 17 are set so that the outside diameter of the first sun gear 15 is larger than that of the second sun gear 17. Thus, the diameter of the first sun gear 15 that is an input element and is required to have greater strength can be made large. As a result, sufficient strength of the first sun gear 15 can be assured. Accordingly, the differential rotation mechanism 3 can be designed to be small-sized, and, consequently, the size of the differential device D according to this embodiment can be reduced.

Also, in the differential device D according to the embodiment of the disclosure, at least one gear pair of a gear pair of the first sun gear 15 and the first pinion 18, and a gear pair of the second sun gear 17 and the second pinion 19, is formed by helical gears. With the helical gears thus used, when torque is applied to the gear pair, thrust force (force in the direction of the rotation axis) is generated according to the torque. Therefore, differential restriction can be imposed on the differential device D, by using frictional sliding resistance generated at end faces of the gears in response to the thrust force. Accordingly, the differential device D according to the embodiment of the disclosure can be provided with a so-called torque sensitive, differential restriction function.

Also, in the differential device D according to the embodiment of the disclosure, the number of teeth $z_1$ of the first gear 9 (the first pinion 18), the number of teeth $z_2$ of the second gear 10 (the second pinion 19), the number of teeth $z_3$ of the input gear 7 (the first sun gear 15), and the number of teeth $z_4$ of the output gear 8 (the second sun gear 17) may be set, so that the relationship that $-2<1/(1-z_3/z_1\times z_2/z_4)<-1$ is satisfied. For example, where the number of teeth $z_1$ of the first gear 9 (the first pinion 18) is "17", the number of teeth $z_2$ of the second gear 10 (the second pinion 19) is "15", the number of teeth $z_3$ of the input gear 7 (the first sun gear 15) is "51", and the number of teeth $z_4$ of the output gear 8 (the second sun gear 17) is "18", $$1/(1-z_3/z_1\times z_2/z_4)=1/\{1-(51/17)\times(15/18)\}=-1.5$$

and the above relationship is satisfied. In the case of a differential rotation mechanism using a conventional, general planetary gear mechanism, the smallest magnitude (absolute value) of the speed reduction ratio that can be set is approximately "3". On the other hand, with the differential device D according to the embodiment, the number of teeth $z_1$ of the first gear, the number of teeth $z_2$ of the second gear, the number of teeth $z_3$ of the input gear, and the number of teeth $z_4$ of the output gear are adjusted as appropriate and set, as in the above example, so that the speed reduction ratio can also be set to within the range from about "1" to about "2". Thus, the differential device D having a high degree of freedom in setting of the torque distribution ratio can be constructed.

FIG. 2 through FIG. 13 show other embodiments of differential devices D to which this disclosure is applied. In the differential devices D that will be described below with reference to the drawings, the same reference signs as those used in FIG. 1 and foregoing drawings are assigned to members, components, and the like, having the same configurations or functions as those of the differential devices D shown in FIG. 1 and foregoing drawings.

The differential device D according to one embodiment of the disclosure is combined with an actuator (or a power source) that generates control torque for differentially rotating the differential rotation mechanism 3 as described above, to provide a differential mechanism (i.e., a torque vectoring device) having a torque vectoring function. The differential device D shown in FIG. 2 constitutes a differential mechanism 30 for a vehicle with a torque vectoring function, which is obtained by combining the differential device D shown in FIG. 1 with a "control actuator". Namely, the differential device D may be provided with the "control actuator".

Figure 2:
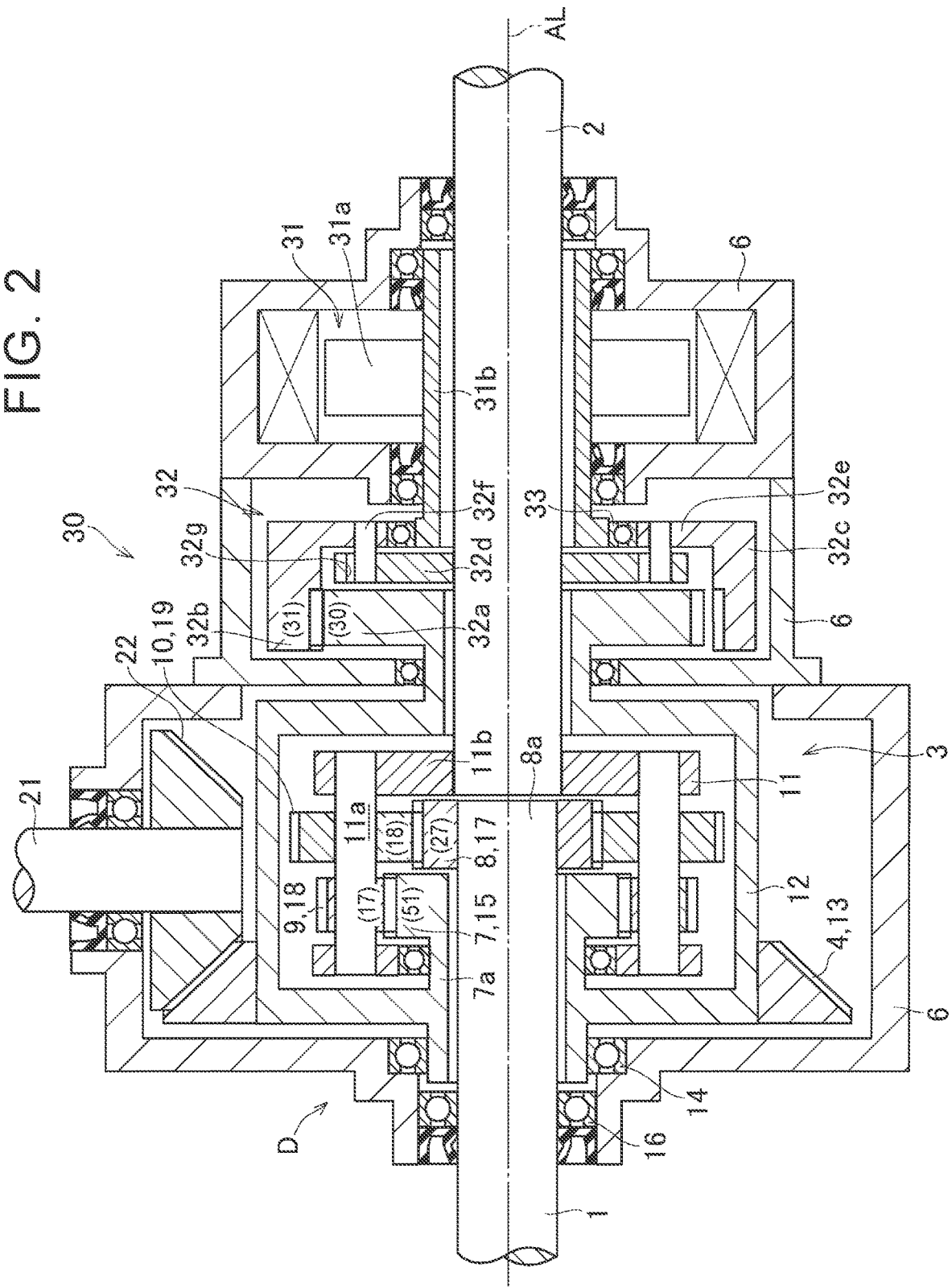
FIG. 2 is a view illustrating another example of a vehicular differential device of the disclosure, and showing an embodiment in which the vehicular differential device of the type shown in FIG. 1 is combined with a "control actuator", to provide a "differential mechanism for the right and left wheels" having a torque vectoring function.

More specifically, in the embodiment shown in FIG. 2, a control motor 31 is provided as the "control actuator". The control motor 31 is an electric motor that is different from the power source that generates drive torque, and generates control torque for controlling a differential state between the first drive shaft 1 and the second drive shaft 2. The control motor 31 is, for example, a permanent magnet type synchronous motor, or an induction motor. The control motor 31 is disposed on the rotation axis AL. Namely, the control motor 31, first drive shaft 1 and second drive shaft 2, and differential rotation mechanism 3 are disposed on the same axis.

The control motor 31 has a rotary shaft of a rotor 31a, namely, a control torque output shaft 31b that generates the control torque. The control torque output shaft 31b is power-transmittably connected to the differential rotation mechanism 3. In the differential device D shown in FIG. 2, a speed reduction mechanism for control 32 is provided between the control motor 31, and the differential rotation mechanism 3 and the second drive shaft 2. Namely, the control motor 31 is connected to the differential rotation mechanism 3 and the second drive shaft 2, via the speed reduction mechanism for control 32.

The speed reduction mechanism for control 32 is disposed on the rotation axis AL. The speed reduction mechanism for control 32 is constructed on the basis of an inscribed planetary gear mechanism. More specifically, the speed reduction mechanism for control 32 has a sun gear 32a, planetary gear 32b, revolution support carrier 32c, and output plate 32d.

The sun gear 32a is an "externally toothed gear", and is connected, as a reaction force element of the speed reduction mechanism for control 32 (inscribed planetary gear mechanism), to the differential rotation mechanism 3, via the torque input member 4. In the embodiment shown in FIG. 2, the sun gear 32a and the input gear 7 (the first sun gear 15) of the differential rotation mechanism 3 are connected, via the differential case 12 and the differential ring gear 13 (the torque input member 4). The sun gear 32a rotates as a unit with the differential ring gear 13 (the torque input member 4) and the input gear 7 (the first sun gear 15).

The planetary gear 32b is a ring gear in the form of an "internally toothed gear", and revolves about the sun gear 32a, namely, about the rotation axis AL, while meshing with the sun gear 32a. The planetary gear 32b transmits torque to the output plate 32d that will be described later, as an output element of the speed reduction mechanism for control 32 (inscribed planetary gear mechanism).

The revolution support carrier 32c has an eccentric flange 32e that is eccentric with respect to the rotation axis AL, according to the orbital path of the planetary gear 32b. The revolution support carrier 32c supports the planetary gear 32b, with the eccentric flange 32e, via a bearing 33. With this arrangement, the revolution support carrier 32c supports revolution of the planetary gear 32b. At the same time, the revolution support carrier 32c, which serves as an input element of the speed reduction mechanism for control 32 (inscribed planetary gear mechanism), is connected to the control torque output shaft 31b of the control motor 31. The revolution support carrier 32c rotates as a unit with the control torque output shaft 31b, and control torque is applied from the control motor 31 to the revolution support carrier 32c.

The output plate 32d is connected to the second drive shaft 2. The output plate 32d and the second drive shaft 2 rotate as a unit. The output plate 32d converts revolving motion of the planetary gear 32b into rotary motion of the second drive shaft 2, using a reaction force pin 32f attached to the planetary gear 32b, and a reaction force hole 32g formed in the output plate 32d. Then, the output plate 32d transmits torque between the planetary gear 32b and the second drive shaft 2.

In the embodiment shown in FIG. 2, the sun gear 32a and planetary gear 32b of the speed reduction mechanism for control 32 are both formed by gears (i.e., cycloidal gears) having a cycloidal tooth profile. Then, the speed reduction mechanism for control 32 is configured such that the number of teeth of the sun gear 32a is "30", and the number of teeth of the planetary gear 32b is "31", as indicated by numerical values in parentheses in FIG. 2. By using the cycloidal gears, a difference "1" in the number of teeth between the sun gear 32a and the planetary gear 32b is provided. With the difference in the number of teeth between the sun gear 32a and the planetary gear 32b being "1", the speed reduction ratio of the inscribed planetary gear mechanism including the sun gear 32a and the planetary gear 32b is equal to the number of teeth of the planetary gear 32b. Accordingly, the speed reduction ratio of the speed reduction mechanism for control 32 is "31". Thus, a relatively large speed reduction ratio is obtained, as compared with a conventional general planetary gear mechanism that can provide a speed reduction ratio of about "4" to "10".

Thus, the differential mechanism 30 shown in FIG. 2 provides the "torque vectoring device", by combining the differential rotation mechanism 3 with the control motor 31. In the embodiment shown in FIG. 2, the control torque generated by the control motor 31 can be amplified by the speed reduction mechanism for control 32, and transmitted to the second drive shaft 2. Through operation of the differential rotation mechanism 3, the control torque transmitted to the second drive shaft 2 rotates the second drive shaft 2, and also rotates the first drive shaft 1 relative to the second drive shaft 2 in the rotational direction opposite to that of the second drive shaft 2. Namely, the first drive shaft 1 and the second drive shaft 2 are allowed to rotate in the opposite directions. Thus, it is possible to positively control the distribution or distribution ratio of the drive torque transmitted from the power source to the first drive shaft 1 and the second drive shaft 2, by controlling the control torque of the control motor 31. Namely, torque vectoring can be performed on the right and left drive wheels to which the first drive shaft 1 and the second drive shaft 2 are respectively connected.

Also, the differential mechanism 30 shown in FIG. 2 includes the speed reduction mechanism for control 32 in the form of the "inscribed planetary gear mechanism", as described above, and a relatively large speed reduction ratio can be set between the control motor 31 and the differential rotation mechanism 3. Therefore, the control torque of the control motor 31 can be amplified at a relatively large amplification factor, and the size of the control motor 31 can be reduced accordingly. Thus, the differential device D according to the embodiment of the disclosure can constitute the differential mechanism 30 that is compact in size and simple in structure, and has the function of torque vectoring.

Figure 3:
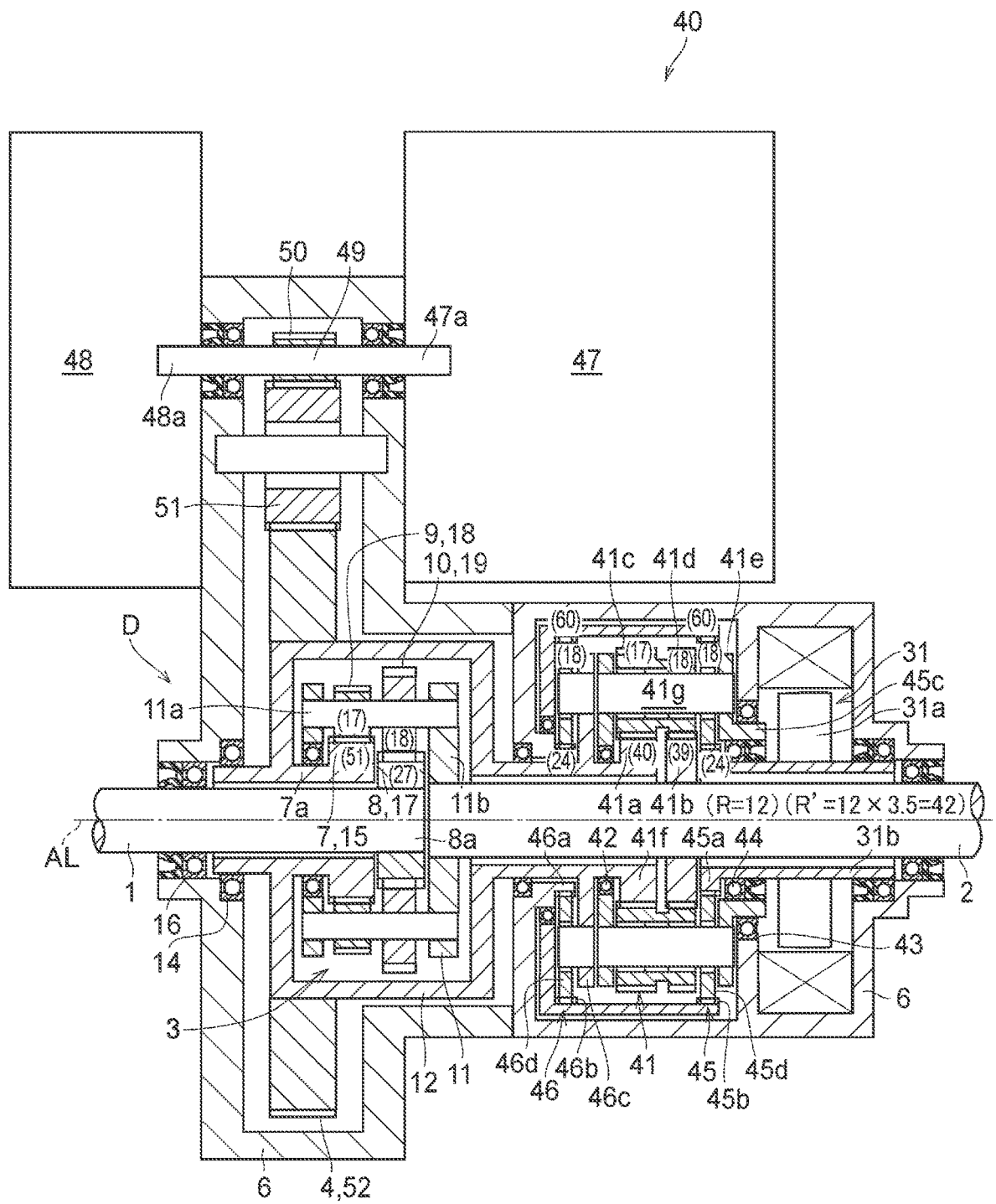
FIG. 3 is a view illustrating another example of a vehicular differential device of the disclosure, and showing an embodiment in which the vehicular differential device of the type shown in FIG. 1 is combined with a "drive motor" and a "brake mechanism", to provide a "power unit" having the torque vectoring function.

A differential device D shown in FIG. 3 provides a differential mechanism for a vehicle having the torque vectoring function, by combining the differential device D shown in FIG. 1 with a "control actuator". Also, the differential device D shown in FIG. 3 cooperates with a power source to provide a power unit 40 having the torque vectoring function.

Like the differential mechanism 30 shown in FIG. 2, the differential device D shown in FIG. 3 is provided with the control motor 31 as the "control actuator". In the differential device D shown in FIG. 3, a speed reduction mechanism for control 41 is provided between the control motor 31, and the differential rotation mechanism 3 and the second drive shaft 2. Namely, the control motor 31 is connected to the differential rotation mechanism 3 and the second drive shaft 2, via the speed reduction mechanism for control 41.

The speed reduction mechanism for control 41 is disposed on the rotation axis AL. The speed reduction mechanism for control 41 amplifies control torque generated by the control motor 31, and transmits the torque to the second drive shaft 2. The speed reduction mechanism for control 41, which is one kind of a "composite planetary gear mechanism", includes a first sun gear 41a, a second sun gear 41b, first pinions 41c, second pinions 41d, and a carrier 41e.

The first sun gear 41a is disposed on the rotation axis AL. The first sun gear 41a is an "externally toothed gear", and is mounted on one end portion (on the right-hand side in FIG. 3) of a sun gear shaft 41f having a hollow shape. The first sun gear 41a and the sun gear shaft 41f rotate as a unit. The sun gear shaft 41f is disposed at the radially outer side of the second drive shaft 2, such that the sun gear shaft 41f can rotate relative to the second drive shaft 2. The other end portion (on the left-hand side in FIG. 3) of the sun gear shaft 41f is connected to the differential case 12 of the differential rotation mechanism 3. The sun gear shaft 41f and the differential case 12 rotate as a unit.

The second sun gear 41b is disposed on the rotation axis AL. The second sun gear 41b is an "externally toothed gear", and is mounted on the outer periphery of the second drive shaft 2. The second sun gear 41b and the second drive shaft 2 rotate as a unit. The first sun gear 41a and the second sun gear 41b rotate relative to each other.

The first pinion 41c is an "externally toothed gear" having the smaller diameter than the first sun gear 41a, and meshes with the first sun gear 41a. The second pinion 41d is an "externally toothed gear" having the smaller diameter than the second sun gear 41b, and meshes with the second sun gear 41b. The first pinion 41c and the second pinion 41d rotate as a unit. As will be described later, the first pinion 41c and the second pinion 41d are supported by the carrier 41e, such that they can respectively rotate about the axes thereof, and can also revolve about the rotation axis AL. Accordingly, the first pinion 41c and the second pinion 41d rotate as a unit in the self-rotating direction (i.e., the direction in which the first pinion 41c and the second pinion 41d respectively rotate about the axes thereof).

The carrier 41e is disposed on the rotation axis AL. The carrier 41e is supported by the sun gear shaft 41f and the case 6, via a bearing 42 and a bearing 43. Also, the carrier 41e is supported by the control torque output shaft 31b of the control motor 31, via a bearing 44. Accordingly, the carrier 41e and the sun gear shaft 41f, and the carrier 41e and the control torque output shaft 31b rotate relative to each other. The carrier 41e supports the first pinions 41c and the second pinions 41d, such that the pinions 41c, 41d can respectively rotate about the axes thereof, and revolve about the rotation axis AL. Then, control torque of the control motor 31 is applied to pinion shafts 41g of the carrier 41e, via a speed reducing planetary gear mechanism 45 that will be described later. More specifically, the first pinions 41c and the second pinions 41d are both supported by the corresponding pinion shafts 41g of the carrier 41e.

The speed reduction mechanism for control 41 serves to amplify control torque generated by the control motor 31, and the "speed reduction ratio" of this mechanism 41 is preferably set to the largest possible ratio. To this end, the speed reduction mechanism for control 41 makes the gear ratio $u_{11}$ of the gear pair of the first sun gear 41a and the first pinion 41c different from the gear ratio $u_{12}$ of the gear pair of the second sun gear 41b and the second pinion 41d. With this arrangement, the speed reduction mechanism for control 41 is configured to reduce the rotational speed of the second sun gear 41b, relative to the rotational speed of the carrier 41e.

For example, in the embodiment shown in FIG. 3, the number of teeth of the first pinion 41c is "17", and the number of teeth of the second pinion 41d is "18", while the number of teeth of the first sun gear 41a is "40", and the number of teeth of the second sun gear 41b is "39", as indicated by numerical values in parentheses in FIG. 3. In this case, the gear ratio $u_{11}$ is obtained as follows.

$$u_{11}=17/40=0.425$$

Similarly, the gear ratio $u_{12}$ is obtained as follows.

$$u_{12}=18/39\approx 0.462$$

Thus, the number of teeth of the first sun gear 41a is set to be different from that of the second sun gear 41b, and the number of teeth of the first pinion 41c is set to be different from that of the second pinion 41d, so that the gear ratio $u_{11}$ and the gear ratio $u_{12}$ are different from each other.

In the embodiment shown in FIG. 3, the speed reduction ratio R of the speed reduction mechanism for control 41 is obtained as follows.

$$R=|1/\{1-(40/17)\times(18/39)\}|\approx 12$$

Thus, a relatively large speed reduction ratio can be obtained, as compared with the speed reduction ratio of about 4 to about 10, which can be provided by a conventional, general planetary gear mechanism. The speed reduction ratio R is indicated as "R=12" in parentheses in FIG. 3.

Thus, the speed reduction mechanism for control 41 reduces the rotational speed of the control torque output shaft 31b of the control motor 31, to amplify the control torque. The speed reduction mechanism for control 41, which is one kind of composite planetary gear mechanism, can establish a relatively large speed reduction ratio, as compared with a speed reduction mechanism using a general planetary gear mechanism. Therefore, the size and weight of the control motor 31 can be reduced, owing to the large speed reducing effect of the speed reduction mechanism for control 41, namely, the large torque amplifying effect on the control torque of the control motor 31. Accordingly, the physical size of the differential device D can be reduced, and, consequently, the ease and efficiency with which the differential device D is installed on the vehicle can be improved.

Furthermore, the differential device D according to the embodiment of the disclosure is provided with a mechanism for curbing co-rotation of the control motor 31 when the control motor 31 is provided for torque vectoring, as described above.

As described above, when the first drive shaft 1 and the second drive shaft 2 rotate at equal speed in the same direction, the differential device D (more specifically, the differential rotation mechanism 3) according to the embodiment of the disclosure co-rotates as a unit with the first and second drive shafts 1, 2. In this case, if the control motor 31 also co-rotates, the power transmission efficiency of the differential device D may deteriorate. Thus, the differential device D shown in FIG. 3 is provided with a speed reducing planetary gear mechanism 45, and a speed increasing planetary gear mechanism 46, in order to avoid or curb co-rotation of the control motor 31. Namely, in one embodiment of the disclosure, the differential device D may be provided with the speed reducing planetary gear mechanism 45, and the speed increasing planetary gear mechanism 46.

The speed reducing planetary gear mechanism 45 is disposed between the control motor 31 and the carrier 41e of the speed reduction mechanism for control 41, and serves to amplify control torque generated by the control motor 31 and transmit the torque to the carrier 41e. Also, the speed reducing planetary gear mechanism 45 functions as a speed reduction mechanism for reducing the rotational speed of the carrier 41e relative to that of the control torque output shaft 31b of the control motor 31, when the differential ring gear 13, first drive shaft 1, and second drive shaft 2 rotate as a unit.

Also, the speed reducing planetary gear mechanism 45 is disposed on the same axis as the first drive shaft 1 and the second drive shaft 2, namely, on the rotation axis AL. The speed reducing planetary gear mechanism 45 is a single-pinion planetary gear mechanism, and has a sun gear, a ring gear, and a carrier. In the embodiment of the disclosure, the sun gear, ring gear, and carrier of the speed reducing planetary gear mechanism 45 will be called speed reducing sun gear 45a, speed reducing ring gear 45b, and speed reducing carrier 45c, respectively, so as to be distinguished from respective rotary elements of other planetary gear mechanisms.

The speed reducing sun gear 45a is formed in a radially outer portion of a hollow rotary shaft, and is rotatably supported by the case 6. The speed reducing sun gear 45a is connected to the control torque output shaft 31b of the control motor 31. The speed reducing sun gear 45a and the control torque output shaft 31b rotate as a unit.

The speed reducing ring gear 45b is an "internally toothed gear" that meshes with planetary gears 45d of the speed reducing planetary gear mechanism 45, and is rotatably supported by the case 6. The speed reducing ring gear 45b is connected to a speed increasing ring gear 46b of a speed increasing planetary gear mechanism 46 that will be described later. The speed reducing ring gear 45b and the speed increasing ring gear 46b rotate as a unit.

The speed reducing carrier 45c supports the planetary gears 45d, such that they can respectively rotate about the axes thereof and revolve. The speed reducing carrier 45c also serves as the carrier 41e of the speed reduction mechanism for control 41, and the speed reducing carrier 45c and the carrier 41e of the speed reduction mechanism for control 41 rotate as a unit. As will be described later, when the differential ring gear 13, first drive shaft 1, and second drive shaft 2 rotate as a unit, the rotational speed of the speed reducing carrier 45c is reduced relative to that of the speed reducing ring gear 45b.

Accordingly, when the control torque is transmitted from the control torque output shaft 31b to the speed reducing planetary gear mechanism 45, and the speed reducing sun gear 45a rotates, the speed reducing ring gear 45b serves as a reaction force element, and the rotational speed of the speed reducing carrier 45c is reduced relative to that of the speed reducing sun gear 45a. Namely, the speed reducing planetary gear mechanism 45 functions as a speed reduction gear mechanism of the control motor 31. Accordingly, the speed reducing planetary gear mechanism 45, which is located between the control motor 31 and the carrier 41e, amplifies the control torque generated by the control motor 31, and transmits it to the carrier 41e.

In the differential device D shown in FIG. 3, the number of teeth of the speed reducing sun gear 45a in the speed reducing planetary gear mechanism 45 is "24", and the number of teeth of the speed reducing ring gear 45b is "60", while the number of teeth of the planetary gear 45d is "18", as indicated by numerical values in parentheses in FIG. 3. Therefore, the speed reduction ratio of the speed reducing planetary gear mechanism 45 is "3.5". Accordingly, the substantial speed reduction ratio R' of the speed reduction mechanism for control 41, which takes account of the speed reduction ratio of the speed reducing planetary gear mechanism 45, is expressed as R'=12×3.5=42, since the speed reduction ratio R of the above speed reduction mechanism for control 41 is "12". Owing to the speed reducing function of the speed reducing planetary gear mechanism 45, the further increased speed reduction ratio R' is obtained.

On the other hand, the speed increasing planetary gear mechanism 46 is disposed on the same axis of the first drive shaft 1 and the second drive shaft 2, namely, on the rotation axis AL. The speed increasing planetary gear mechanism 46 is a single-pinion planetary gear mechanism, and has a sun gear, a ring gear, and a carrier. In the embodiment of the disclosure, the sun gear, ring gear, and carrier of the speed increasing planetary gear mechanism 46 will be respectively called speed increasing sun gear 46a, speed increasing ring gear 46b, and speed increasing carrier 46c, so as to be distinguished from respective rotary elements of other planetary gear mechanisms.

The speed increasing sun gear 46a is formed in a radially outer portion of a hollow shaft member, and is irrotatably fixed. For example, the speed increasing sun gear 46a is attached to a flange portion (not shown) formed integrally with the case 6.

The speed increasing ring gear 46b is an "internally toothed gear" that meshes with planetary gears 46d of the speed increasing planetary gear mechanism 46, and is rotatably supported by the case 6, along with the speed reducing ring gear 45b of the speed reducing planetary gear mechanism 45. The speed increasing ring gear 46b is connected to the speed reducing ring gear 45b. Or the speed increasing ring gear 46b is formed integrally with the speed reducing ring gear 45b. The speed increasing ring gear 46b and the speed reducing ring gear 45b rotate as a unit. When the speed increasing carrier 46c is rotated, the rotational speed of the speed increasing ring gear 46b is increased, relative to that of the speed increasing carrier 46c.

The speed increasing carrier 46c supports the planetary gears 46d such that they can respectively rotate about the axes thereof and revolve. The speed increasing carrier 46c is connected to the differential ring gear 13, the first sun gear 15 of the differential rotation mechanism 3, and the first sun gear 41a of the speed reduction mechanism for control 41. The speed increasing carrier 46c rotates as a unit with the differential ring gear 13, first sun gear 15, and first sun gear 41a.

Accordingly, when drive torque is transmitted from the differential ring gear 13 to rotate the speed increasing carrier 46c, the speed increasing sun gear 46a serves as a reaction force element, and the speed increasing planetary gear mechanism 46 functions as a speed increasing mechanism that increases the rotational speed of the speed increasing ring gear 46b relative to that of the speed increasing carrier 46c.

In the differential device D shown in FIG. 3, the number of teeth of the speed increasing sun gear 46a in the speed increasing planetary gear mechanism 46 is "24", and the number of teeth of the speed increasing ring gear 46b is "60", while the number of teeth of the planetary gear 46d is "18", as indicated by numerical values in parenthesis in FIG. 3. Namely, the number of teeth of the speed increasing sun gear 46a, the number of teeth of the speed increasing ring gear 46b, and the number of teeth of the planetary gear 46d are equal to the number of teeth of the speed reducing sun gear 45a, the number of teeth of the speed reducing ring gear 45b, and the number of teeth of the planetary gear 45d in the speed reducing planetary gear mechanism 45, respectively. Accordingly, the gear ratio (or speed transmission ratio, or speed ratio) of the speed increasing planetary gear mechanism 46 is equal to that of the speed reducing planetary gear mechanism 45.

When the first drive shaft 1 and second drive shaft 2 rotate at equal speed in the same direction, the whole of the differential device D according to the embodiment of the disclosure rotates as a unit. At the same time, the speed increasing carrier 46c of the speed increasing planetary gear mechanism 46 and the speed reducing carrier 45c of the speed reducing planetary gear mechanism 45 rotate at equal speed in the same direction. In this case, the speed increasing planetary gear mechanism 46 functions as a speed increasing mechanism that increases the rotational speed of the speed increasing ring gear 46b relative to that of the speed increasing carrier 46c, in a condition where rotation of the speed increasing sun gear 46a is stopped. On the other hand, the speed reducing planetary gear mechanism 45 functions as a speed reduction mechanism that reduces the rotational speed of the speed reducing carrier 45c relative to that of the speed reducing ring gear 45b. The rotational speed of the speed increasing carrier 46c is equal to that of the speed reducing carrier 45c. Also, since the speed increasing ring gear 46b is connected to the speed reducing ring gear 45b, the rotational speed of the speed increasing ring gear 46b is equal to that of the speed reducing ring gear 45b. Therefore, the absolute value of the speed increase ratio of the speed increasing planetary gear mechanism 46 is equal to the absolute value of the speed reduction ratio of the speed reducing planetary gear mechanism 45. In this case, since the rotational speed of the speed increasing sun gear 46a is "0", in the speed reducing planetary gear mechanism 45, the rotational speed of the speed reducing sun gear 45a is reduced to "0" or a rotational speed around "0", relative to that of the speed reducing ring gear 45b, according to the gear ratio of the speed reducing planetary gear mechanism 45. In the differential device D shown in FIG. 3, the gear ratio of the speed increasing planetary gear mechanism 46 is equal to that of the speed reducing planetary gear mechanism 45; therefore, the rotational speed of the speed reducing sun gear 45a is equal to "0". Accordingly, when the first drive shaft 1 and the second drive shaft 2 rotate at equal speed in the same direction, and the differential device D co-rotates as a unit, the rotational speed of the control torque output shaft 31b of the control motor 31 connected to the speed reducing sun gear 45a is equal to "0". Namely, co-rotation of the control motor 31 is curbed or prevented.

Accordingly, with the differential device D shown in FIG. 3, co-rotation of the control motor 31 that generates control torque can be curbed, and the power transmission efficiency of the power unit 40 can be improved. Consequently, the energy efficiency of the vehicle on which the power unit 40 is installed can be improved. Also, since co-rotation of the control motor 31 is curbed when the vehicle is rapidly accelerated or rapidly decelerated while it is traveling straight, for example, an influence of the inertia torque of the control motor 31 can be removed. Thus, it is not necessary to separately perform control of torque that cancels or reduces the inertia torque that would appear when the control motor 31 is co-rotated, and the load of the device that controls the control motor 31 can be reduced. Consequently, the controllability in the torque vectoring control by the power unit 40 and the control motor 31 can be improved.

In the differential device D shown in FIG. 3, a drive motor 47 and a brake mechanism 48 are provided as power sources. More specifically, an output shaft 47a of the drive motor 47 is connected to one end portion (on the right-hand side in FIG. 3) of a power shaft 49. The drive motor 47 generates drive torque that accelerates the vehicle, or regenerative torque that brakes the vehicle. The drive motor 47 is, for example, a permanent magnet type synchronous motor, or an induction motor. A rotary shaft 48a of the brake mechanism 48 is connected to the other end portion (on the left-hand side in FIG. 3) of the power shaft 49. The brake mechanism 48 generates braking torque as so-called negative drive torque. The brake mechanism 48 is, for example, an excitation operation type electromagnetic brake that brakes a rotary member by using magnetic attractive force generated through energization, or an electric brake that generates friction braking force using a feed screw mechanism driven by an electric motor, or a regenerative brake that brakes a rotary member by using resistance force generated when power is generated by a motor. Thus, in the differential device D shown in FIG. 3, a motor with a braking function is mounted as a power source to a differential mechanism, to provide a unit.

A pinion 50 is mounted on a central portion of the power shaft 49. The pinion 50 and the power shaft 49 rotate as a unit. The pinion 50 meshes with a counter gear 51. The counter gear 51 is rotatably supported by the case 6. Also, the counter gear 51 meshes with a differential ring gear 52 i.e., the torque input member 4. The differential ring gear 52 is formed on the outer periphery of the differential case 12. The differential case 12 and the differential ring gear 52 rotate as a unit. Accordingly, the differential ring gear 52 rotates as a unit with the first sun gear 15 of the differential rotation mechanism 3, and the first sun gear 41a of the speed reduction mechanism for control 41.

The counter gear 51 has the larger diameter and the larger number of teeth than the pinion 50. Therefore, a gear pair of the pinion 50 and the counter gear 51 forms a speed reducing gear mechanism that reduces the rotational speed of the differential ring gear 52, i.e. the torque input member 4, relative to the rotational speed of the pinion 50. Accordingly, the drive torque of the power sources (in the example shown in FIG. 3, the drive motor 47 and the brake mechanism 48) applied to the power shaft 49 is amplified by the speed reducing gear mechanism as described above, and is transmitted to the differential device D.

Thus, the power unit 40 having the function of torque vectoring can be constructed by assembling the drive motor 47 and the brake mechanism 48 integrally with the differential device D according to the embodiment of the disclosure. In this connection, the differential device D of the embodiment may be assembled only with the drive motor 47 as a power source. In this case, a motor drive unit (not shown) having the function of torque vectoring can be constructed. Alternatively, the differential device D may be assembled only with the brake mechanism 48 as a power source. In this case, a brake unit (not shown) having the function of torque vectoring can be constructed.

Figure 4:
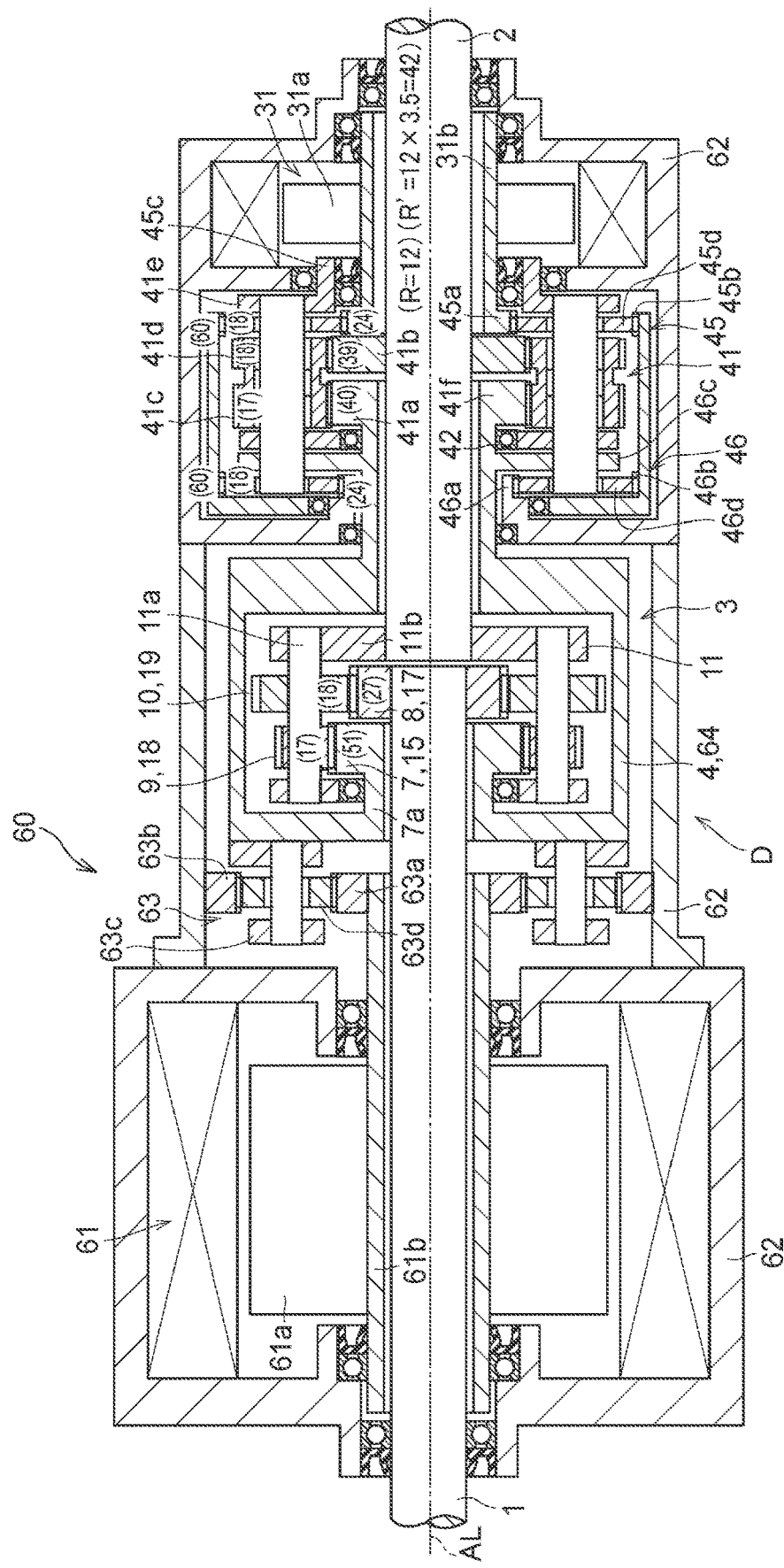
FIG. 4 is a view illustrating another example of a vehicular differential device of the disclosure, and showing an embodiment in which the vehicular differential device of the type shown in FIG. 1 is combined with a "drive motor" and a "control actuator", to provide a "power unit having a uniaxial structure (a center differential integrated with a drive motor)" having the torque vectoring function.

A differential device D shown in FIG. 4 is supposed to be installed on a four-wheel-drive vehicle, and constitutes a so-called center differential mechanism 60. Namely, in the differential device D shown in FIG. 4, the first drive shaft 1 and the second drive shaft 2 are disposed on the same axis, such that they are longitudinally opposed to each other in the overall length direction (the lateral direction in FIG. 4) of the vehicle (not shown).

The differential device D shown in FIG. 4 includes a drive motor 61 as a power source. The drive motor 61 is, for example, a permanent magnet type synchronous motor, or an induction motor. The drive motor 61 is integrally disposed on the same axis as the first drive shaft 1 and the second drive shaft 2, namely, on the rotation axis AL. The drive motor 61 generates drive torque for driving or braking the first drive shaft 1 and the second drive shaft 2.

The drive motor 61 has a rotor 61a, and a rotor shaft 61b that rotatably supports the rotor 61a. The rotor shaft 61b is rotatably supported by a case 62. The case 62 serves as a case of the drive motor 61, a case of the differential device D, and a case of the control motor 31. The rotor shaft 61b is a hollow shaft, and the first drive shaft 1 is disposed in a hollow portion of the rotor shaft 61b. The rotor shaft 61b and the first drive shaft 1 rotate relative to each other. The rotor shaft 61b is connected to the torque input member 4 of the differential rotation mechanism 3, via a speed reducing gear mechanism 63. In the embodiment shown in FIG. 4, a differential case 64 of the differential rotation mechanism 3 corresponds to the torque input member 4. The differential case 64 rotates as a unit with the input gear 7, i.e. the first sun gear 15 of the differential rotation mechanism 3, and the first sun gear 41a of the speed reduction mechanism for control 41.

The speed reducing gear mechanism 63 amplifies drive torque generated by the drive motor 61, and transmits it to the torque input member 4 of the differential rotation mechanism 3, i.e. the differential case 64. The speed reducing gear mechanism 63 is a single-pinion planetary gear mechanism having a sun gear 63a, ring gear 63b, and carrier 63c.

The sun gear 63a is formed in a radially outer portion of a hollow rotary shaft, and is connected to the rotor shaft 61b of the drive motor 61. For example, the hollow shaft formed integrally with the sun gear 63a is connected to the rotor shaft 61b. Or the sun gear 63a is integrally formed on a distal end portion of the rotor shaft 61b. Accordingly, the sun gear 63a and the rotor shaft 61b rotate as a unit. The ring gear 63b is an "internally toothed gear" that meshes with planetary gears 63d of the planetary gear mechanism that constitutes the speed reducing gear mechanism 63. The ring gear 63b is irrotatably fixed to an inner wall of the case 62. The carrier 63c supports the planetary gears 63d such that they can respectively rotate about the axes thereof and revolve. The carrier 63c is connected to the differential case 64. The carrier 63c and the differential case 64 rotate as a unit.

In the speed reducing gear mechanism 63, when drive torque generated by the drive motor 61 is transmitted to the sun gear 63a, the ring gear 63b serves as a reaction force element, and the rotational speed of the carrier 63c connected to the differential case 64 is reduced relative to the rotational speed of the sun gear 63a. Namely, the speed reducing gear mechanism 63 amplifies the drive torque generated by the drive motor 61, and transmits it to the torque input member 4 of the differential rotation mechanism 3. Thus, the speed reducing gear mechanism 63 provides a final reduction gear (final gear) of the vehicle.

Thus, the differential device D shown in FIG. 4 is used, to provide the center differential mechanism 60 that incorporates the drive motor 61 as the power source on the same axis. Then, the center differential mechanism 60 having the uniaxial structure shown in FIG. 4 can be installed as a power unit on the four-wheel-drive vehicle. Namely, by using the differential device D according to the embodiment of the disclosure, it is possible to provide a compact power unit having both the function of the center differential mechanism 60 and the function of torque vectoring.

Figure 5:
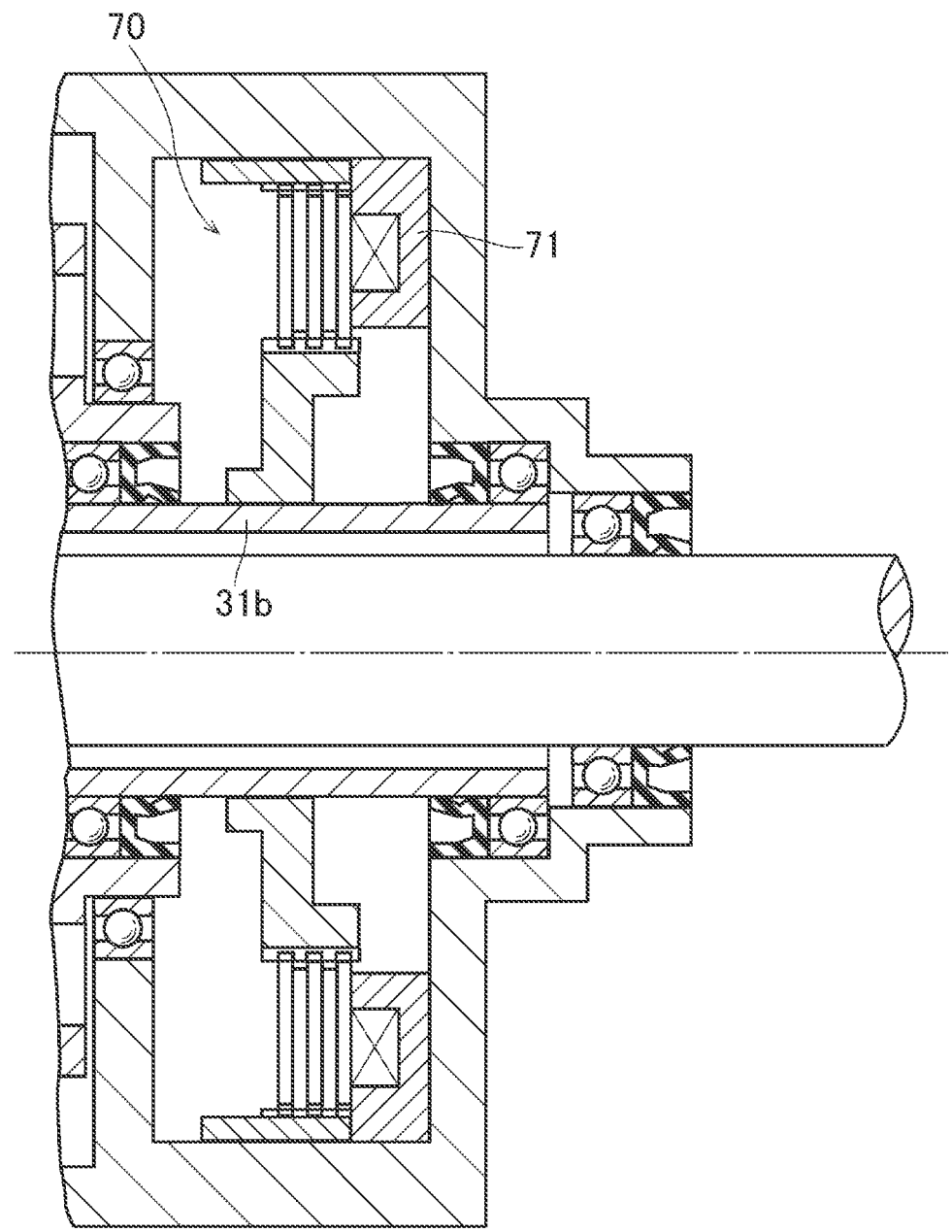
FIG. 5 is a view showing an embodiment in which the "power unit having the uniaxial structure" shown in FIG. 4 is provided with an "electromagnetic brake" as the "control actuator"
Figure 6:
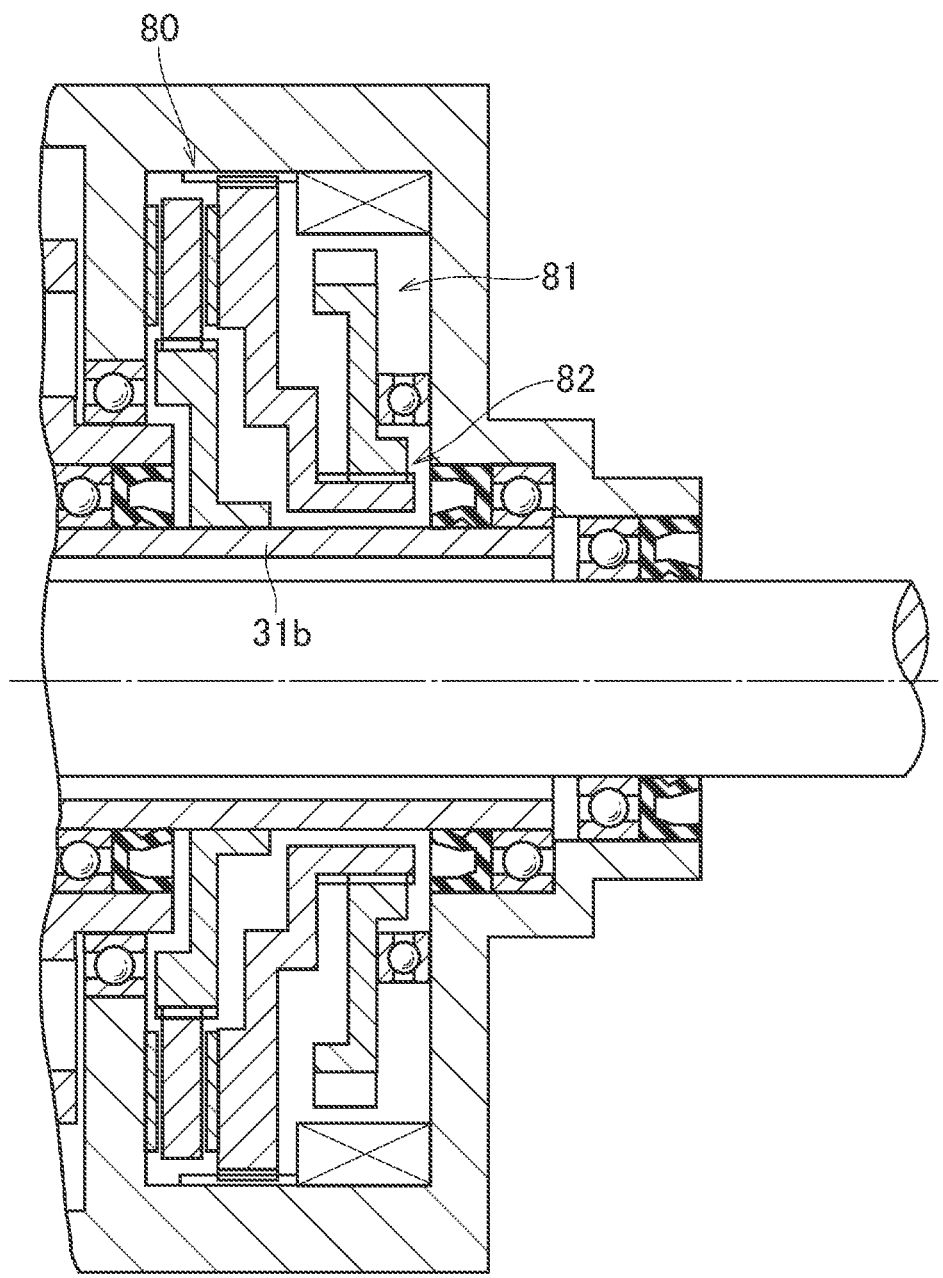
FIG. 6 is a view showing an embodiment in which the "power unit having the uniaxial structure" shown in FIG. 4 is provided with an "electric brake" as the "control actuator"

In the differential device D according to one embodiment of the disclosure, a brake mechanism that generates control torque, i.e., torque that brakes the torque input member 4 of the differential device D, may be used, in addition to the control motor 31 as described above. For example, as shown in FIG. 5, an electromagnetic brake 70 of excitation operation type may be used as the brake mechanism that generates braking torque. The electromagnetic brake 70 brakes an input rotational element of the differential device D, by using magnetic attractive force generated by energizing a coil 71. Alternatively, as shown in FIG. 6, an electric brake 80 that generates frictional braking force by using a feed screw mechanism 82 driven by an electric motor 81 may be used.

Figure 7:
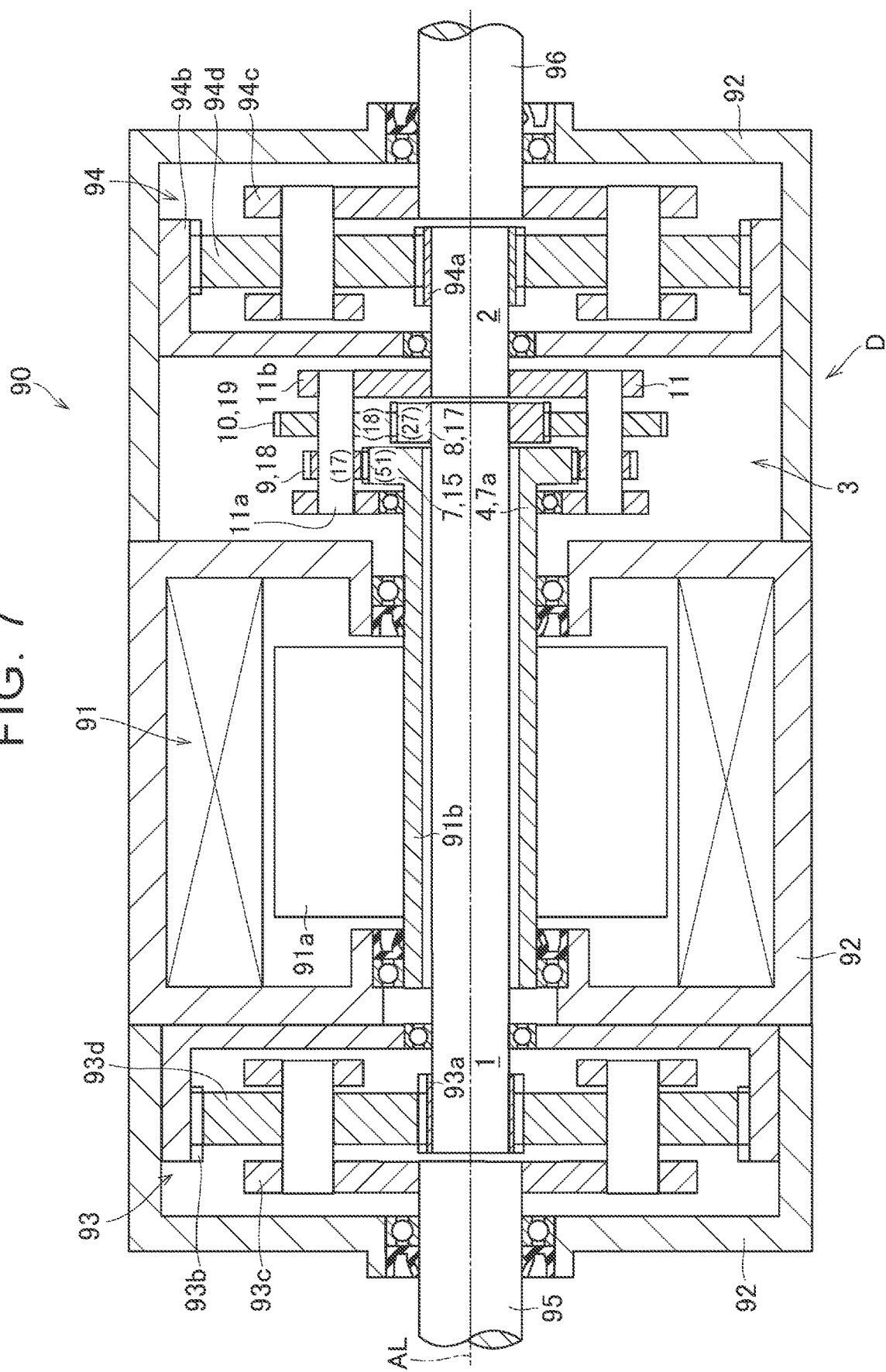
FIG. 7 is a view illustrating another example of a vehicular differential device of the disclosure, and showing an embodiment in which the vehicular differential device of the type shown in FIG. 1 is combined with a "drive motor" and a "speed reduction mechanism", to provide a "power unit having a uniaxial structure"

A differential device D shown in FIG. 7 is supposed to be installed on a vehicle, as a power source that generates drive torque to the right and left drive wheels, and constitutes a power unit 90 having a so-called uniaxial structure. Namely, in the differential device D shown in FIG. 7, the first drive shaft 1 and the second drive shaft 2 are disposed on the same axis, such that they are laterally opposed to each other in the vehicle width direction (the lateral direction in FIG. 7) of the vehicle.

The power unit 90 includes a drive motor 91 as a power source. The drive motor 91 is, for example, a permanent magnet type synchronous motor, or an induction motor. The drive motor 91 is integrally disposed on the same axis as the first drive shaft 1 and the second drive shaft 2, namely, on the rotation axis AL. The drive motor 91 generates drive torque that drives or brakes the first drive shaft 1 and the second drive shaft 2.

The drive motor 91 has a rotor 91a, and a rotor shaft 91b that rotatably supports the rotor 91a. The rotor shaft 91b is rotatably supported by a case 92. The case 92 serves as a case of the drive motor 91, a case of the differential device D, and cases of a first speed reduction mechanism 93 and a second speed reduction mechanism 94 that will be described later. The rotor shaft 91b is a hollow shaft, and the first drive shaft 1 is disposed in a hollow portion of the rotor shaft 91b. The rotor shaft 91b and the first drive shaft 1 rotate relative to each other. The rotor shaft 91b is connected to the torque input member 4 of the differential rotation mechanism 3. In the embodiment shown in FIG. 7, the rotary shaft 7a of the input gear 7 (the first sun gear 15) in the differential rotation mechanism 3 corresponds to the torque input member 4. Accordingly, the rotor shaft 91b and the first sun gear 15 rotate as a unit.

Further, the differential device D shown in FIG. 7 is provided with the first speed reduction mechanism 93 and the second speed reduction mechanism 94. The first speed reduction mechanism 93 is disposed, on the rotation axis AL, between the first drive shaft 1, and an axle connected to one of the right and left drive wheels (not shown) as viewed in the vehicle width direction. In the embodiment shown in FIG. 7, the first speed reduction mechanism 93 is disposed between the first drive shaft 1, and a first axle 95 connected to the left drive wheel (on the left-hand side in FIG. 7) in the vehicle width direction. Similarly, the second speed reduction mechanism 94 is disposed, on the rotation axis AL, between the second drive shaft 2, and an axle connected to the other of the right and left drive wheels (not shown) in the vehicle width direction. In the embodiment shown in FIG. 7, the second speed reduction mechanism 94 is disposed between the second drive shaft 2, and a second axle 96 connected to the right drive wheel (on the right-hand side in FIG. 7) in the vehicle width direction. Thus, the differential rotation mechanism 3, drive motor 91, first speed reduction mechanism 93, and second speed reduction mechanism 94 are all disposed on the rotation axis AL.

The first speed reduction mechanism 93 amplifies torque of the first drive shaft 1 and transmits it to the first axle 95. The first speed reduction mechanism 93 is a single-pinion planetary gear mechanism having a sun gear 93a, ring gear 93b, and carrier 93c. The sun gear 93a is formed at a distal end of the first drive shaft 1, on an end portion (left end portion in FIG. 7) of the first drive shaft 1 opposite to the side where the output gear 8 (the second sun gear 17) is formed. The sun gear 93a rotates as a unit with the first drive shaft 1. The ring gear 93b is an "internally toothed gear" that meshes with planetary gears 93d of the planetary gear mechanism that constitute the first speed reduction mechanism 93. The ring gear 93b is irrotatably fixed to an inner wall of the case 92. The carrier 93c supports the planetary gears 93d such that they can respectively rotate about the axes thereof and revolve. The carrier 93c is connected to the first axle 95. The carrier 93c and the first axle 95 rotate as a unit.

In the first speed reduction mechanism 93, when the torque of the first drive shaft 1 is transmitted to the sun gear 93a, the ring gear 93b serves as a reaction force element, and the rotational speed of the carrier 93c connected to the first axle 95 is reduced relative to the rotational speed of the sun gear 93a. Namely, the first speed reduction mechanism 93 amplifies the torque of the first drive shaft 1, and transmits it to the first axle 95 and the corresponding drive wheel.

On the other hand, the second speed reduction mechanism 94 amplifies torque of the second drive shaft 2, and transmits it to the second axle 96. The second speed reduction mechanism 94 is a single-pinion planetary gear mechanism having a sun gear 94a, ring gear 94b, and carrier 94c. The sun gear 94a is formed at a distal end of the second drive shaft 2, on an end portion (right end portion in FIG. 7) of the second drive shaft 2 opposite to the side where the carrier 11 is formed. The sun gear 94a and the second drive shaft 2 rotate as a unit. The ring gear 94b is an "internally toothed gear" that meshes with planetary gears 94d of the planetary gear mechanism that constitute the second speed reduction mechanism 94. The ring gear 94b is irrotatably fixed to an inner wall of the case 92. The carrier 94c supports the planetary gears 94d such that they can respectively rotate about the axes thereof and revolve. The carrier 94c is connected to the second axle 96. The carrier 94c and the second axle 96 rotate as a unit.

In the second speed reduction mechanism 94, when the torque of the second drive shaft 2 is transmitted to the sun gear 94a, the ring gear 94b serves as a reaction force element, and the rotational speed of the carrier 94c connected to the second axle 96 is reduced relative to the rotational speed of the sun gear 94a. Namely, the second speed reduction mechanism 94 amplifies the torque of the second drive shaft 2, and transmits it to the second axle 96 and the corresponding drive wheel.

Thus, the differential device D according to the embodiment of the disclosure is combined with the drive motor 91, and the first speed reduction mechanism 93 and second speed reduction mechanism 94, to provide a power unit that serves as a drive power source of the vehicle. The differential device D, drive motor 91, first speed reduction mechanism 93, and second speed reduction mechanism 94 are all disposed on the same rotation axis AL. Thus, the power unit having the uniaxial structure, in which the differential device D of the embodiment is incorporated, is constructed. In this case, the differential device D is located on the upstream side of each of speed reduction mechanisms 93, 94. Namely, the differential device D is disposed between the drive motor 91, and the first speed reduction mechanism 93 and the second speed reduction mechanism 94. As a result, the drive torque that has not been amplified by the first speed reduction mechanism 93 and the second speed reduction mechanism 94 is applied to the differential device D. Therefore, the load applied to the differential device D can be reduced, and the size of the differential device D is less likely or unlikely to be increased. Thus, the differential device D according to the embodiment of the disclosure can provide the power unit 90 of the uniaxial structure which is compact in size, and is simple in structure.

Figure 8:
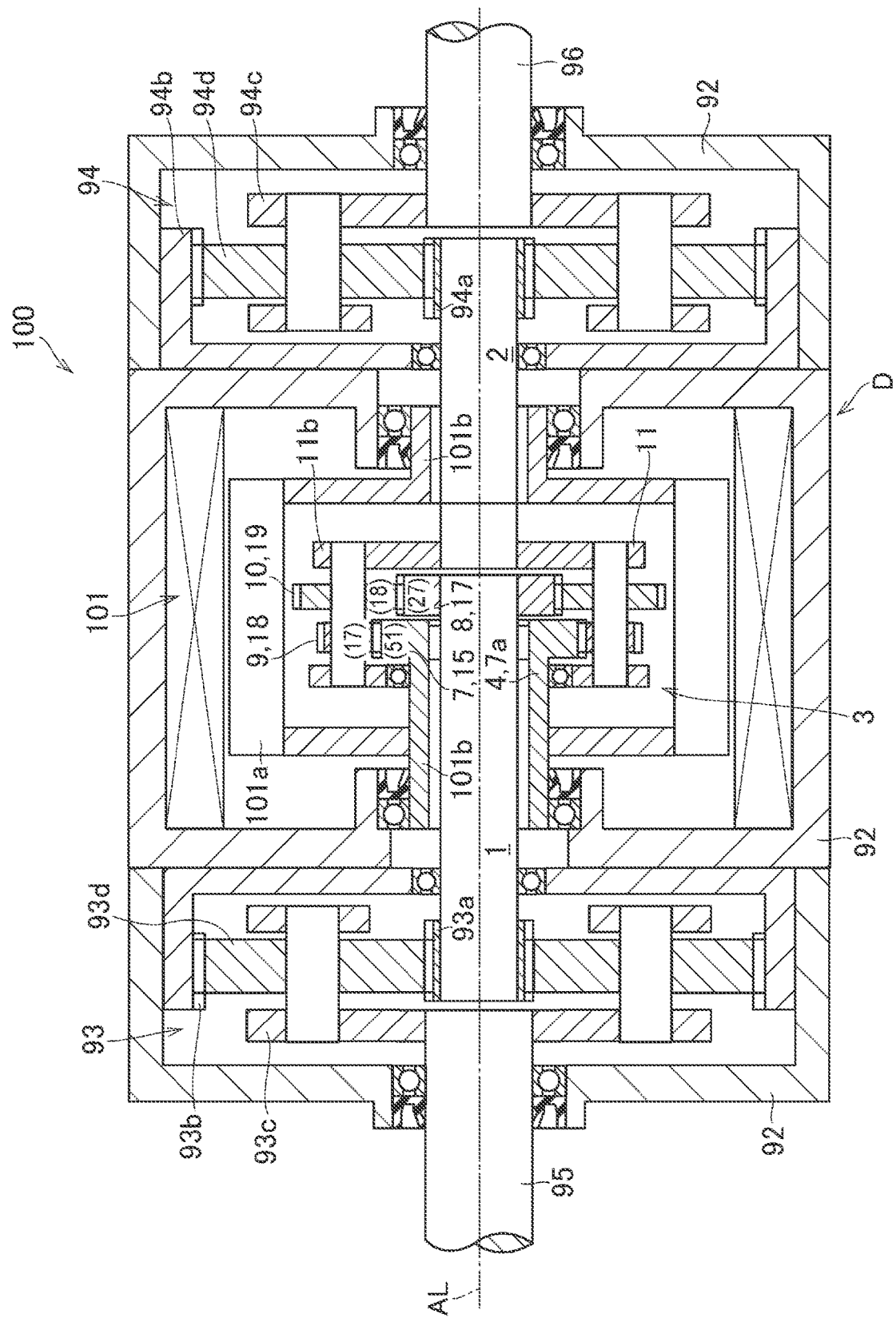
FIG. 8 is a view illustrating another example of a vehicular differential device of the disclosure, and showing an embodiment in which the vehicular differential device of the type shown in FIG. 1 is combined with a "drive motor with a hollow rotor" and a "speed reduction mechanism", to provide a "power unit having a uniaxial structure"

A differential device D shown in FIG. 8 constitutes a power unit 100 having a uniaxial structure, like the power unit 90 shown in FIG. 7. In the power unit 100, a "drive motor with a hollow rotor" is used, so as to reduce the physical size as measured in the direction of the rotation axis AL. In the differential device D shown in FIG. 8, the first drive shaft 1 and the second drive shaft 2 are disposed on the same axis, to be laterally opposed to each other in the vehicle width direction (the lateral direction in FIG. 8).

The power unit 100 includes a drive motor 101 as a power source. The power unit 100 also includes the first speed reduction mechanism 93 and the second speed reduction mechanism 94. In the power unit 100, too, the differential rotation mechanism 3, drive motor 101, first speed reduction mechanism 93, and second speed reduction mechanism 94 are all disposed on the rotation axis AL, as in the power unit 90 shown in FIG. 7.

The drive motor 101 is, for example, a permanent magnet type synchronous motor, or an induction motor. In particular, the drive motor 101 uses a rotor 101a having a hollow structure as described later; therefore, a so-called coreless motor in which an iron core of the rotor 101a is removed may be employed. The drive motor 101 has the rotor 101a, and a rotor shaft 101b that rotatably supports the rotor 101a.

The rotor 101a has a hollow structure, and has space in its hollow portion. The differential rotation mechanism 3 is placed in the hollow portion of the rotor 101a. Namely, the differential rotation mechanism 3 is incorporated in the rotor 101a of the drive motor 101 having the hollow structure.

The rotor shaft 101b is rotatably supported by the case 92. The rotor shaft 101b is a hollow shaft, and the first drive shaft 1 and the second drive shaft 2 are disposed in its hollow portion. The rotor shaft 101b rotates relative to the first drive shaft 1 and the second drive shaft 2. The rotor shaft 101b is connected to the torque input member 4 of the differential rotation mechanism 3. In the embodiment shown in FIG. 8, the rotary shaft 7a of the input gear 7 (the first sun gear 15) in the differential rotation mechanism 3 corresponds to the torque input member 4. Accordingly, the rotor shaft 101b and the first sun gear 15 rotate as a unit.

Thus, in the differential device D according to the embodiment of the disclosure, the drive motor 101 having the rotor 101a of the hollow structure is used. Then, the differential rotation mechanism 3 is placed in the hollow portion of the rotor 101a. Namely, the differential rotation mechanism 3 is incorporated in the rotor 101a of the drive motor 101. Thus, the overall length of the power unit 100 as measured in the direction of the rotation axis AL can be reduced, as compared with the arrangement where the drive motor 91 and the differential rotation mechanism 3 are arranged in series in the direction of the rotation axis AL, as in the power unit 90 shown in FIG. 7, for example. Thus, the differential device D according to the embodiment of the disclosure can provide the power unit 100 of the uniaxial structure, which is further compact in size and further simple in structure, and has the reduced overall length in the direction of the rotation axis AL.

Figure 9:
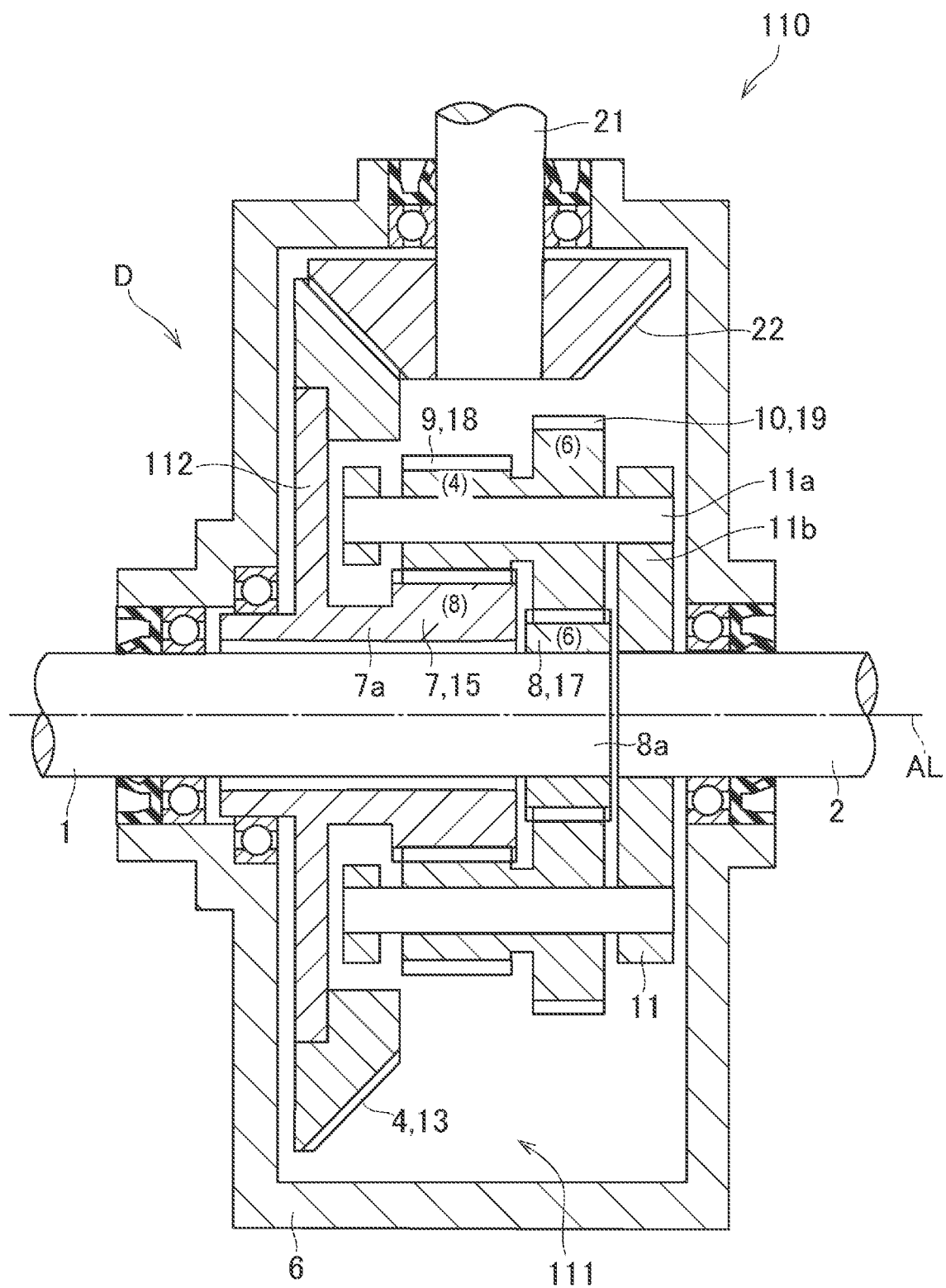
FIG. 9 is a view illustrating another example of a vehicular differential device of the disclosure, and showing an embodiment in which a "differential case" is eliminated from the vehicular differential device of the type shown in FIG. 1, to provide an "open differential"

A differential device D shown in FIG. 9 uses a differential rotation mechanism 111 from which a "differential case" is eliminated for simplification, to provide a differential mechanism 110 (open differential) for a vehicle.

The differential rotation mechanism 111 is configured such that the differential case 12 of the differential rotation mechanism 3 is eliminated as described above. Therefore, the differential rotation mechanism 111 is provided with an input plate 112. The input plate 112 is a flange-like rotary member, and is attached to the outer periphery of the rotary shaft 7a of the input gear 7 (the first sun gear 15). The input plate 112 and the rotary shaft 7a rotate as a unit. Then, the differential ring gear 13 is attached to a radially outer portion of the input plate 112. The input plate 112 and the differential ring gear 13 rotate as a unit. Accordingly, in the embodiment shown in FIG. 9, the rotary shaft 7a of the input gear 7 (the first sun gear 15) is connected to the differential ring gear 13, or the torque input member 4, via the input plate 112.

In the differential device D shown in FIG. 9, too, the first gear ratio $u_1$ between the input gear 7 (the first sun gear 15) and the first gear 9 (the first pinion 18) is set to be different from the second gear ratio $u_2$ between the output gear 8 (the second sun gear 17) and the second gear 10 (the second pinion 19).

For example, the differential device D is configured such that the number of teeth $z_1$ of the first gear 9 (the first pinion 18) is "4", and the number of teeth $z_2$ of the second gear 10 (the second pinion 19) is "6", while the number of teeth $z_3$ of the input gear 7 (the first sun gear 15) is "8", and the number of teeth $z_4$ of the output gear 8 (the second sun gear 17) is "6", as indicated by numerical values in parentheses in FIG. 9. In this case, the first gear ratio $u_1$ and the second gear ratio $u_2$ are obtained as follows.

$$u_1=z_1/z_3=4/8=0.5$$

$$u_2=z_2/z_4=6/6=1.0$$

Thus, the first gear ratio $u_1$ and the second gear ratio $u_2$ are not equal to each other, but are different from each other.

In the differential device D shown in FIG. 9, too, the number of teeth $z_1$ of the first gear 9 (the first pinion 18), the number of teeth $z_2$ of the second gear 10 (the second pinion 19), the number of teeth $z_3$ of the input gear 7 (the first sun gear 15), and the number of teeth $z_4$ of the output gear 8 (the second sun gear 17) are set, so that the relationship that $1/(1-z_3/z_1 \times z_2/z_4)=-1$ is satisfied. Where the numbers of teeth $z_1$, $z_2$, $z_3$, $z_4$ of the respective gears are the numeral values indicated in parentheses in FIG. 9, as in the above example, $$1/(1-z_3/z_1 \times z_2/z_4)=1/\{1-(8/4)\times(6/6)\}=-1$$

and the above relationship is satisfied.

Thus, the differential device D according to the embodiment of the disclosure incorporates the differential rotation mechanism 111 from which the "differential case" is eliminated for simplification, to provide the differential mechanism 110. When a load applied to the differential device D is small, for example, the differential rotation mechanism 111 simplified as described above is employed, so as to provide the differential mechanism 110 that is compact in size, and is simple in structure.

Figure 10:
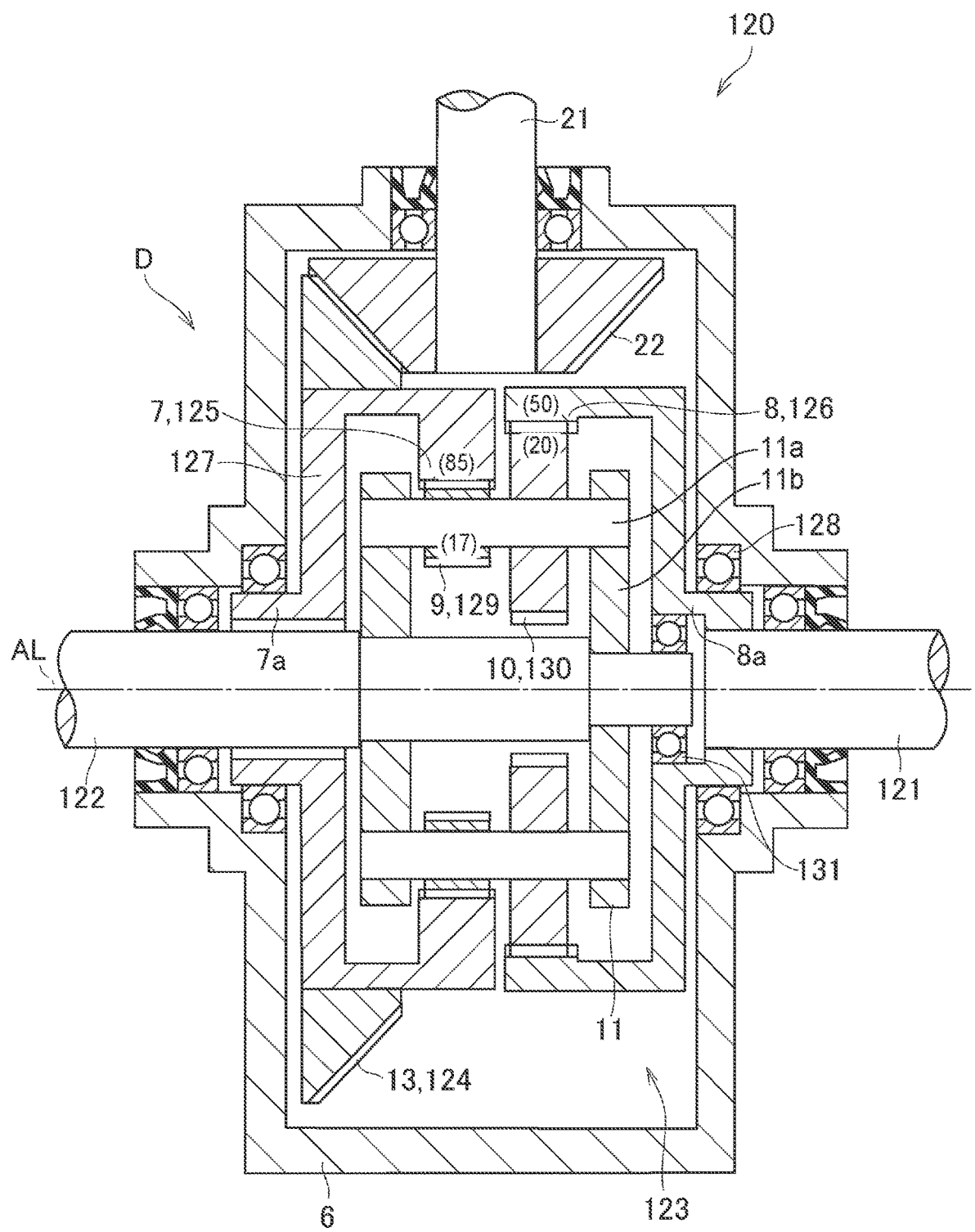
FIG. 10 is a view illustrating another example of a vehicular differential device of the disclosure, and showing an embodiment in which the vehicular differential device is of a type in which two sets of planetary gear mechanisms each including a ring gear and pinions constitute a "differential rotation mechanism", to provide an "open differential"

A differential device D shown in FIG. 10 uses two sets of planetary gear mechanisms each including a "ring gear" and "pinions (planetary gears)", to provide a differential mechanism 120 (open differential) for a vehicle. The differential device D shown in FIG. 10 includes two main rotary shafts, i.e., a first drive shaft 121 and a second drive shaft 122, a differential rotation mechanism 123, and a torque input member 124.

The first drive shaft 121 and the second drive shaft 122 are disposed on the same axis to be opposed to each other, and rotate relative to each other. More specifically, the first drive shaft 121 and the second drive shaft 122 are both disposed on the rotation axis AL. Each of the first drive shaft 121 and the second drive shaft 122 is rotatably supported by the case 6 of the differential device D, via a bearing (not shown). In the embodiment shown in FIG. 10, the second drive shaft 122 and the first drive shaft 121 are arranged in this order, as viewed from the left in FIG. 10. Accordingly, the first drive shaft 121 is rotatably supported at one end (a left end portion in FIG. 10) by the case 6. One of the right and left drive wheels (not shown) of the vehicle is connected to a protruding distal end (a right end portion in FIG. 10) of the first drive shaft 121. Similarly, the second drive shaft 122 is rotatably supported at one end (a right end portion in FIG. 10) by the case 6. The other drive wheel (not shown) is connected to a protruding distal end (a left end portion in FIG. 10) of the second drive shaft 122.

The differential rotation mechanism 123 is disposed on the rotation axis AL. The differential rotation mechanism 123 permits differential rotation of the first drive shaft 121 and the second drive shaft 122. The differential rotation mechanism 123 is formed from the input gear 7, output gear 8, first gears 9, second gears 10, and carrier 11, as main constituent elements, like the differential rotation mechanism 3 as described above.

The input gear 7 and the output gear 8 are disposed in series (namely, arranged side by side in the direction of the rotation axis AL) on the same rotation axis AL. In the embodiment shown in FIG. 10, the input gear 7 and the output gear 8 are arranged in the order, as viewed from the left in FIG. 10.

In the embodiment shown in FIG. 10, the input gear 7 is a first ring gear 125 in the form of an "internally toothed gear", and meshes with the first gears 9 (i.e., first pinions 129 that will be described later). Also, the output gear 8 is a second ring gear 126 in the form of an "internally toothed gear", and meshes with the second gears 10 (i.e., second pinions 130 that will be described later).

The input gear 7 (the first ring gear 125) and the output gear 8 (the second ring gear 126) can rotate relative to each other. In the embodiment shown in FIG. 10, the rotary shaft 7a of the input gear 7 (the first ring gear 125) is a hollow shaft, and the second drive shaft 122 is placed in a hollow portion of the rotary shaft 7a. Accordingly, the rotary shaft 7a and the second drive shaft 122 can rotate relative to each other.

The rotary shaft 7a of the input gear 7 (the first ring gear 125) is connected to the differential ring gear 13, via an input plate 127. The input plate 127 is a flange-like rotary member, and is attached to the outer periphery of the rotary shaft 7a. The input plate 127 and the rotary shaft 7a rotate as a unit. Then, the differential ring gear 13 is attached to the outer periphery of the input plate 127. The input plate 127 and the differential ring gear 13 rotate as a unit. Accordingly, in the embodiment shown in FIG. 10, the rotary shaft 7a of the input gear 7 (the first ring gear 125) is connected to the differential ring gear 13, i.e. the torque input member 124, via the input plate 127.

The rotary shaft 8a of the output gear 8 (the second ring gear 126) is connected to the first drive shaft 121. Or the rotary shaft 8a is formed integrally with the first drive shaft 121. The rotary shaft 8a and the first drive shaft 121 rotate as a unit. Accordingly, the output gear 8 (the second ring gear 126) and the first drive shaft 121 rotate as a unit. The output gear 8 (the second ring gear 126) and the first drive shaft 121 are supported by the case 6, via a bearing 128.

The first gear 9 and the second gear 10 are disposed in series (namely, arranged side by side in the direction of the rotation axis AL) on the same axis. In the embodiment shown in FIG. 10, the first gear 9 and the second gear 10 are arranged in this order, as viewed from the left in FIG. 10. The first gear 9 and the second gear 10 rotate as a unit. As will be described later, the first gears 9 and the second gears 10 are supported by the carrier 11, such that they can rotate about the axis thereof, and can also revolve about the rotation axis AL.

In the embodiment shown in FIG. 10, the first gear 9 is a first pinion 129 in the form of a small-diameter "externally toothed gear", and meshes with the input gear 7, i.e. the first ring gear 125. Also, the second gear 10 is a second pinion 130 in the form of a small-diameter "externally toothed gear", and meshes with the output gear 8, i.e. the second ring gear 126.

The carrier 11 is disposed on the rotation axis AL. The carrier 11 is supported by the rotary shaft 8a of the output gear 8 (the second ring gear 126), via a bearing 131. The carrier 11 and the rotary shaft 8a can rotate relative to each other. Accordingly, the carrier 11, and the input gear 7 (the first ring gear 125) and output gear 8 (the second ring gear 126), rotate relative to each other. The carrier 11 supports the first pinions 129 and the second pinions 130, such that the pinions 129, 130 can respectively rotate about the axes thereof, and can revolve about the rotation axis AL. More specifically, in the embodiment shown in FIG. 10, the carrier 11 has pinion shafts 11a, and a plate portion 11b. The first pinions 129 and the second pinions 130 are integrally mounted on the pinion shafts 11a. The pinion shaft 11a, first pinion 129, and second pinion 130 rotate as a unit. The plate portion 11b rotatably supports the pinion shafts 11a. The plate portion 11b is connected to the second drive shaft 122. The plate portion 11b and the second drive shaft 122 rotate as a unit. Accordingly, the carrier 11 and the second drive shaft 122 rotate as a unit.

Two or more sets (which will be referred to as "planetary sets") of the first pinion 129, second pinion 130, and pinion shaft 11a supported by the carrier 11 are provided on the revolving path (circular path) of the "planetary sets". In FIG. 10, two "planetary sets" are disposed to be opposed to each other in a radial direction of the revolving path.

As described above, in the embodiment shown in FIG. 10, the differential device D includes the first drive shaft 121, second drive shaft 122, differential rotation mechanism 123, and torque input member 124. The differential device D shown in FIG. 10 constitutes a differential mechanism 120 (open differential) for the right and left drive wheels of the vehicle. The differential rotation mechanism 123 as a main constituent element of the differential device D includes a total of four types of gears, i.e., the input gear 7 (the first ring gear 125), the output gear 8 (the second ring gear 126), the first gears 9 (the first pinions 129), and the second gears 10 (the second pinions 130), and the carrier 11. The first gears 9 (the first pinions 129) and the second gears 10 (the second pinions 130), which mesh with the input gear 7 (the first ring gear 125) and the output gear 8 (the second ring gear 126), respectively, revolve about the rotation axis AL. Namely, all of the first gears 9 (the first pinions 129) and the second gears 10 (the second pinions 130) are so-called planetary gears of the planetary gear mechanisms. In sum, the differential device D according to this embodiment of the disclosure substantially includes two sets of planetary gear mechanisms that share the carrier 11, or a composite planetary gear mechanism into which two sets of planetary gear mechanisms sharing the carrier 11 are combined. In the embodiment shown in FIG. 10, the differential device D consists of two sets of planetary gear mechanisms using no "sun gears". Thus, the planetary gear mechanism of this embodiment has a simpler structure, as compared with a general planetary gear mechanism that includes three rotary elements of "sun gear", "ring gear", and "pinions".

In the differential device D according to the embodiment of the disclosure, when the first drive shaft 121 and the second drive shaft 122 rotate at equal speed (the same rotational speed) in the same direction, the first drive shaft 121 and second drive shaft 122, and the differential rotation mechanism 123, rotate as a unit. In this case, the drive torque is equally distributed and transmitted to the first drive shaft 121 and the second drive shaft 122. On the other hand, when the rotational speed of the first drive shaft 121 is different from the rotational speed of the second drive shaft 122, the first drive shaft 121 and the second drive shaft 122 rotate relative to each other in opposite directions, to perform differential rotation.

To this end, in the differential device D, the first gear ratio $u_1$ between the input gear 7 (the first ring gear 125) and the first gear 9 (the first pinion 129) is set to be different from the second gear ratio $u_2$ between the output gear 8 (the second ring gear 126) and the second gear 10 (the second pinion 130).

For example, the differential device D is configured, such that the number of teeth $z_1$ of the first gear 9 (the first pinion 129) is "17", and the number of teeth $z_2$ of the second gear 10 (the second pinion 130) is "20", while the number of teeth $z_3$ of the input gear 7 (the first ring gear 125) is "85", and the number of teeth $z_4$ of the output gear 8 (the second ring gear 126) is "50", as indicated by numerical values in parentheses in FIG. 10. In this case, the first gear ratio $u_1$ and the second gear ratio $u_2$ are obtained as follows.

$$u_1 = z_1/z_3 = 17/85 = 0.2$$

$$u_2 = z_2/z_4 = 20/50 = 0.4$$

Thus, the first gear ratio $u_1$ and the second gear ratio $u_2$ are not equal to each other, but are different from each other.

In the differential device D constructed as described above, the drive torque applied to the torque input member 124 (the differential ring gear 13) is distributed and transmitted to the input gear 7 (the first ring gear 125) and the output gear 8 (the second ring gear 126). At this time, when the rotational speed of the first drive shaft 121 is equal to that of the second drive shaft 122, the output gear 8 (the second ring gear 126) and the carrier 11 rotate as a unit.

More specifically, when the drive torque is applied to the input gear 7 (the first ring gear 125), the first gears 9 (the first pinions 129) and the second gears 10 (the second pinions 130) rotate. At this time, since the first gear ratio $u_1$ between the first gear 9 (the first pinion 129) and the input gear 7 (the first ring gear 125) is smaller than the second gear ratio $u_2$ between the second gear 10 (the second pinion 130) and the output gear 8 (the second ring gear 126), the input gear 7 (the first ring gear 125) tends to rotate at a lower speed than the output gear 8 (the second ring gear 126). On the other hand, the output gear 8 (the second ring gear 126) tends to rotate at a higher speed than the input gear 7 (the first ring gear 125). Therefore, the input gear 7 (the first ring gear 125) and the output gear 8 (the second ring gear 126) tend to rotate in opposite directions relative to each other. Namely, torque acts in opposite directions to each meshing portion of the first gear 9 (the first pinion 129) and the input gear 7 (the first ring gear 125), and each meshing portion of the second gear 10 (the second pinion 130) and the output gear 8 (the second ring gear 126). However, in fact, the first gear 9 (the first pinion 129) and the second gear 10 (the second pinion 130) rotate as a unit. Therefore, the meshing portions interfere with each other. As a result, the differential rotation mechanism 123 of the differential device D as a whole is in a substantially engaged state, and rotates as a unit. Namely, all of the input gear 7 (the first ring gear 125), the output gear 8 (the second ring gear 126), and the carrier 11 rotate as a unit. Accordingly, the first drive shaft 121 and the second drive shaft 122 rotate as a unit without performing differential rotation.

On the other hand, when there is a difference between the rotational speed of the first drive shaft 121 and that of the second drive shaft 122, namely, when the output gear 8 (the second ring gear 126) and the carrier 11 perform differential rotation, the differential device D is no longer in the substantially engaged state established by the interference of the meshing portions. Therefore, the drive torque is transmitted via a power transmission path from the torque input member 124 (the differential ring gear 13) to the output gear 8 (the second ring gear 126), and a power transmission path from the torque input member 124 (the differential ring gear 13) to the carrier 11, respectively, while allowing the output gear 8 (the second ring gear 126) and the carrier 11 to rotate differentially. In this case, the output gear 8 (the second ring gear 126) and the carrier 11 rotate differentially, according to the gear ratio (speed reduction ratio) of the composite planetary gear mechanism that provides the differential rotation mechanism 123 as described above.

In the differential device D according to the embodiment of the disclosure, the number of teeth $z_1$ of the first gear 9 (the first pinion 129), the number of teeth $z_2$ of the second gear 10 (the second pinion 130), the number of teeth $z_3$ of the input gear 7 (the first ring gear 125), and the number of teeth $z_4$ of the output gear 8 (the second ring gear 126) are set, so that the following relationship is satisfied.

$$1/(1 - z_3/z_1 \times z_2/z_4) = -1$$

When the respective numbers of teeth $z_1$, $z_2$, $z_3$, $z_4$ are numerical values indicated in parentheses in FIG. 10, as in the above example, $$1/(1 - z_3/z_1 \times z_2/z_4) = 1/\{1 - (85/17) \times (20/50)\} = -1,$$

and the above relationship is satisfied.

The term "$1/(1 - z_3/z_1 \times z_2/z_4)$" in the above expression is the reciprocal of the ratio of the rotation speed of the input gear 7 (the first ring gear 125) to that of the carrier 11, and is the speed reduction ratio of the differential rotation mechanism 123 (the composite planetary gear mechanism) that takes account of the rotational direction (the speed reduction ratio to which the negative sign is given means that the rotational direction of the carrier 11 is opposite to the rotational direction of the input gear 7 (the first ring gear 125)). Thus, since the speed reduction ratio of the differential rotation mechanism 123 is "−1", the carrier 11 rotate at equal speed, in the reverse rotational direction, relative to the input gear 7 (the first ring gear 125) and the output gear 8 (the second ring gear 126), when the first drive shaft 121 and the second drive shaft 122 rotate differentially. Namely, the first drive shaft 121 and the second drive shaft 122 rotate at equal speed relative to each other, in the opposite directions. Accordingly, with the differential device D according to the embodiment of the disclosure, it is possible to equally distribute and transmit the drive torque applied to the torque input member 124 (the differential ring gear 13) to the first drive shaft 121 and the second drive shaft 122, while permitting differential rotation of the first drive shaft 121 and the second drive shaft 122.

Thus, the differential device D according to the embodiment of the disclosure has a principal portion that is substantially constituted by two sets of planetary gear mechanisms, or a composite planetary gear mechanism, and distributes and transmits the drive torque applied from the power source, to the first drive shaft 121 and the second drive shaft 122. At the same time, the differential device D permits differential rotation of the first drive shaft 121 and the second drive shaft 122, and absorbs a difference in the rotational speed between the first drive shaft 121 and the second drive shaft 122. Accordingly, the differential device D of this embodiment provides the differential mechanism 120 (open differential) that is compact in size, and is simple in structure.

Figure 11:
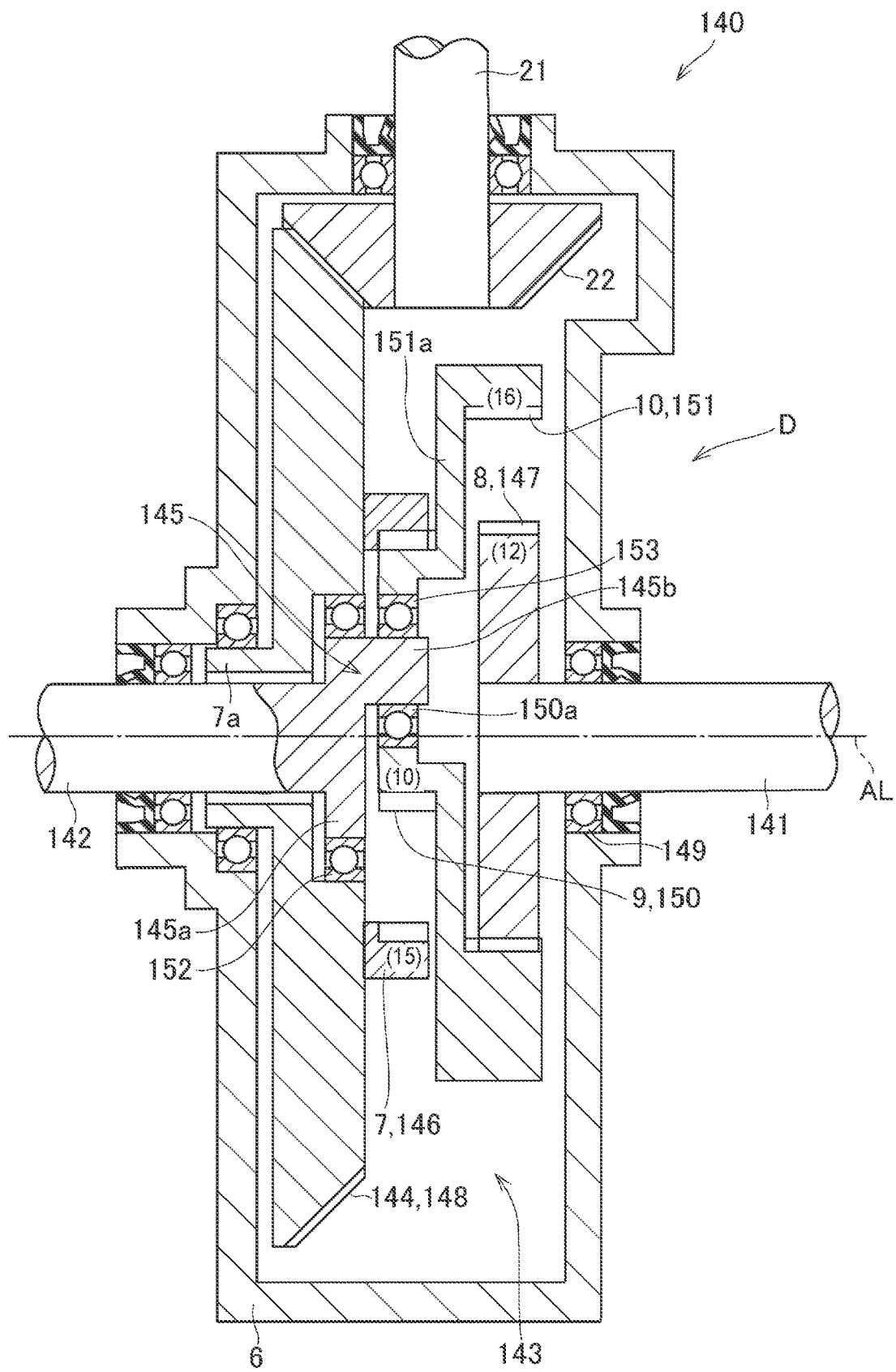
FIG. 11 is a view illustrating another example of a vehicular differential device of the disclosure, and showing an embodiment in which the vehicular differential device is of a type in which two sets of inscribed planetary gear mechanisms constitute a "differential rotation mechanism", to provide an "open differential"

A differential device D shown in FIG. 11 uses two sets of inscribed planetary gear mechanisms each including a "ring gear", "sun gear", and "planetary gear", to provide a differential mechanism 140 (open differential) for a vehicle. The differential device D shown in FIG. 11 includes two main rotary shafts, i.e., a first drive shaft 141 and a second drive shaft 142, a differential rotation mechanism 143, and a torque input member 144.

The first drive shaft 141 and the second drive shaft 142 are disposed on the same axis to be opposed to each other, and rotate relative to each other. More specifically, the first drive shaft 141 and the second drive shaft 142 are both disposed on the rotation axis AL. Each of the first drive shaft 141 and the second drive shaft 142 is rotatably supported by the case 6 of the differential device D, via a bearing. In the embodiment shown in FIG. 11, the second drive shaft 142 and the first drive shaft 141 are arranged in this order, as viewed from the left in FIG. 11. Accordingly, the first drive shaft 141 is rotatably supported at one end (a left end portion in FIG. 11) by the case 6. One of the right and left drive wheels (not shown) of the vehicle is connected to a protruding distal end (a right end portion in FIG. 11) of the first drive shaft 141. Similarly, the second drive shaft 142 is rotatably supported at one end (a right end portion in FIG. 11) by the case 6. The other drive wheel (not shown) is connected to a protruding distal end (a left end portion in FIG. 11) of the second drive shaft 142.

The differential rotation mechanism 143 is disposed on the rotation axis AL. The differential rotation mechanism 143 permits differential rotation of the first drive shaft 141 and the second drive shaft 142. Like the above differential rotation mechanism 3, the differential rotation mechanism 143 includes the input gear 7, output gear 8, first gear 9, second gear 10, and a carrier 145, as main constituent elements.

The input gear 7 and the output gear 8 are disposed in series on the same rotation axis AL (namely, are arranged side by side in the direction of the rotation axis AL). In the embodiment shown in FIG. 11, the input gear 7 and the output gear 8 are arranged in this order, as viewed from the left in FIG. 11.

In the embodiment shown in FIG. 11, the input gear 7 is an input ring gear 146 in the form of an "internally toothed gear", and meshes with the first gear 9 (i.e., a first planetary gear 150 that will be described later). Also, the output gear 8 is an output sun gear 147 in the form of an "externally toothed gear", and meshes with the second gear 10 (i.e., a second planetary gear 151 that will be described later).

The input gear 7 (the input ring gear 146) and the output gear 8 (the output sun gear 147) can rotate relative to each other. In the embodiment shown in FIG. 11, the input gear 7 (the input ring gear 146) is connected to a differential ring gear 148. The input gear 7 (the input ring gear 146) and the differential ring gear 148 rotate as a unit. The differential ring gear 148 is a large-diameter bevel gear, like the above differential ring gear 13, and meshes with the drive pinion 22 provided at a distal end of the propeller shaft 21 (a lower end portion of the propeller shaft 21 shown in FIG. 11) of the vehicle (not shown). Thus, the differential ring gear 148 serves as the torque input member 144 to which drive torque is applied from a power source.

In the embodiment shown in FIG. 11, the rotary shaft 7a of the input gear 7 (the input ring gear 146) and the differential ring gear 148 is a hollow shaft, and the second drive shaft 142 is placed in a hollow portion of the rotary shaft 7a. Accordingly, the rotary shaft 7a and the second drive shaft 142 can rotate relative to each other.

The rotary shaft 8a of the output gear 8 (the output sun gear 147) is connected to the first drive shaft 141. Or the rotary shaft 8a is formed integrally with the first drive shaft 141. The rotary shaft 8a and the first drive shaft 141 rotate as a unit. Accordingly, the output gear 8 (the output sun gear 147) and the first drive shaft 141 rotate as a unit. The output gear 8 (the output sun gear 147) and the first drive shaft 141 are supported by the case 6, via a bearing 149.

The first gear 9 and the second gear 10 are disposed in series on the same axis (namely, are arranged side by side in the direction of the rotation axis AL). In the embodiment shown in FIG. 11, the first gear 9 and the second gear 10 are arranged in this order, as viewed from the left in FIG. 11. The first gear 9 and the second gear 10 rotate as a unit. As will be described later, the first gear 9 and the second gear 10 are supported by the carrier 145, such that they can rotate about themselves, and can revolve about the rotation axis AL.

In the embodiment shown in FIG. 11, the first gear 9 is the first planetary gear 150 in the form of an "externally toothed gear", and meshes with the input gear 7, i.e. the input ring gear 146. Also, the second gear 10 is the second planetary gear 151 in the form of an "internally toothed gear", and meshes with the output gear 8, i.e. the output sun gear 147. The first planetary gear 150 and the second planetary gear 151 are formed integrally. In the embodiment shown in FIG. 11, the inside diameter of the second planetary gear 151 is larger than the outside diameter of the first planetary gear 150. The first planetary gear 150 is connected to an arm portion 151a formed in a radially inner portion of the second planetary gear 151. Alternatively, the first planetary gear 150 is formed integrally with the arm portion 151a of the second planetary gear 151. Accordingly, the first planetary gear 150 and the second planetary gear 151 rotate as a unit.

The carrier 145 is disposed on the rotation axis AL. The carrier 145 is supported by the rotary shaft 7a of the input gear 7 (the input ring gear 146) and the differential ring gear 148, via a bearing 152. The carrier 145 and the rotary shaft 7a can rotate relative to each other. Accordingly, the carrier 145, the input gear 7 (the input ring gear 146) and differential ring gear 148, and the output gear 8 (the output sun gear 147) rotate relative to each other.

In the embodiment shown in FIG. 11, the carrier 145 has a plate portion 145a and a planetary shaft 145b. The plate portion 145a is connected to the second drive shaft 142. The plate portion 145a and the second drive shaft 142 rotate as a unit. Accordingly, the carrier 145 and the second drive shaft 142 rotate as a unit. The planetary shaft 145b is a cylindrical shaft member, and is attached to the plate portion 145a, at a position that is decentered radially outwardly of the plate portion 145a from the rotation axis AL. The planetary shaft 145b is fitted in a rotation axis hole 150a of the first planetary gear 150 and second planetary gear 151, via a bearing 153. The planetary shaft 145b rotates relative to the first planetary gear 150 and second planetary gear 151. Accordingly, the carrier 145 supports the first planetary gear 150 and the second planetary gear 151, such that they can respectively rotate about the axes thereof and revolve about the rotation axis AL.

The outside diameter of the first planetary gear 150 is smaller than the inside diameter of the input ring gear 146. Also, the number of external teeth of the first planetary gear 150 is smaller than the number of internal teeth of the input ring gear 146. Therefore, the first planetary gear 150 revolves along the inner periphery of the input ring gear 146, while meshing with the input ring gear 146. Thus, the input ring gear 146 and the first planetary gear 150 constitute a so-called "inscribed planetary gear mechanism".

Similarly, the inside diameter of the second planetary gear 151 is larger than the outside diameter of the output sun gear 147. Also, the number of internal teeth of the second planetary gear 151 is larger than the number of external teeth of the output sun gear 147. Therefore, the second planetary gear 151 revolves along the outer periphery of the output sun gear 147, while meshing with the output sun gear 147. Thus, the output sun gear 147 and the second planetary gear 151 constitute a so-called "inscribed planetary gear mechanism".

Thus, the differential rotation mechanism 143 as a main constituent element of the differential device D shown in FIG. 11 includes a total of four gears, i.e., the input gear 7 (the input ring gear 146), output gear 8 (output sun gear 147), first gear 9, (first planetary gear 150), and second gear 10 (second planetary gear 151), and the carrier 145. In sum, the differential device D according to the embodiment of the disclosure is constituted by two sets of "inscribed planetary gear mechanisms" that share the carrier 145. Namely, in the embodiment shown in FIG. 11, the differential device D is constituted by two sets of "inscribed planetary gear mechanisms" that use no "pinions". The inscribed planetary gear mechanism has a simper structure, as compared with a general planetary gear mechanism that includes three rotary elements, i.e., "sun gear", "ring gear", and "pinions".

In the differential device D according to the embodiment of the disclosure, when the first drive shaft 141 and the second drive shaft 142 rotate at equal speed (the same rotational speed) in the same direction, the first drive shaft 141 and second drive shaft 142 rotate as a unit with the differential rotation mechanism 143. In this case, the drive torque is equally distributed and transmitted to the first drive shaft 141 and the second drive shaft 142. On the other hand, when the rotational speed of the first drive shaft 141 is different from that of the second drive shaft 142, the first drive shaft 141 and the second drive shaft 142 rotate relative to each other in opposite directions, to perform differential rotation.

To this end, in the differential device D, the first gear ratio $u_1$ between the input gear 7 (the input ring gear 146) and the first gear 9 (the first planetary gear 150) is set to be different from the second gear ratio $u_2$ between the output gear 8 (the output sun gear 147) and the second gear 10 (the second planetary gear 151).

For example, the differential device D is configured such that the number of teeth $z_1$ of the first gear 9 (the first planetary gear 150) is "10", and the number of teeth $z_2$ of the second gear 10 (the second planetary gear 151) is "16", while the number of teeth $z_3$ of the input gear 7 (the input ring gear 146) is "15", and the number of teeth $z_4$ of the output gear 8 (the output sun gear 147) is "12", as indicated by numerical values in parentheses in FIG. 11. In the case of the embodiment shown in FIG. 11, the first gear ratio $u_1$ and the second gear ratio $u_2$ are obtained as follows.

$$u_1 = z_1/z_3 = 10/15 \approx 0.666$$

$$u_2 = z_4/z_2 = 12/16 = 0.75$$

The first gear ratio $u_1$ and the second gear ratio $u_2$ are not equal to each other, but are different from each other.

In the differential device D constructed as described above, the drive torque applied to the torque input member 144 (the differential ring gear 148) is distributed and transmitted to the input gear 7 (the input ring gear 146) and the output gear 8 (the output sun gear 147). When the rotational speed of the first drive shaft 141 is equal to that of the second drive shaft 142, the output gear 8 (the output sun gear 147) and the carrier 145 rotate as a unit.

More specifically, when the drive torque is applied to the input gear 7 (the input ring gear 146), the first gear 9 (the first planetary gear 150) and the second gear 10 (the second planetary gear 151) rotate. At this time, since the first gear ratio $u_1$ between the first gear 9 (the first planetary gear 150) and the input gear 7 (the input ring gear 146) is smaller than the second gear ratio $u_2$ between the second gear 10 (the second planetary gear 151) and the output gear 8 (the output sun gear 147), the input gear 7 (the input ring gear 146) tends to rotate at a lower speed than the output gear 8 (the output sun gear 147). On the other hand, the output gear 8 (the output sun gear 147) tends to rotate at a higher speed than the input gear 7 (the input ring gear 146). Therefore, the input gear 7 (the input ring gear 146) and the output gear 8 (the output sun gear 147) tend to rotate relative to each other in opposite directions. Namely, torque is applied in opposite directions to a meshing portion between the first gear 9 (the first planetary gear 150) and the input gear 7 (the input ring gear 146), and a meshing portion between the second gear 10 (the second planetary gear 151) and the output gear 8 (the output sun gear 147). However, in fact, the first gear 9 (the first planetary gear 150) and the second gear 10 (the second planetary gear 151) rotate as a unit. Therefore, the respective meshing portions interfere with each other. As a result, the differential rotation mechanism 143 of the differential device D as a whole is in a substantially engaged state, and rotates as a unit. Namely, all of the input gear 7 (the input ring gear 146), output gear 8 (output sun gear 147), and carrier 145 rotate as a unit. Accordingly, the first drive shaft 141 and the second drive shaft 142 rotate as a unit, without performing differential rotation.

On the other hand, when there is a difference in the rotational speed between the first drive shaft 141 and the second drive shaft 142, namely, when the output gear 8 (the output sun gear 147) and the carrier 145 rotate differentially, the differential device D is released from the substantially engaged state established by the interference of the respective engaging portions. Therefore, the drive torque is transmitted via a power transmission path from the torque input member 144 (the differential ring gear 148) to the output gear 8 (the output sun gear 147), and a power transmission path from the torque input member 144 (the differential ring gear 148) to the carrier 145, respectively, while permitting differential rotation of the output gear 8 (the output sun gear 147) and the carrier 145. In this case, the output gear 8 (the output sun gear 147) and the carrier 145 rotate differentially, according to the gear ratio (speed reduction ratio) of the composite planetary gear mechanism (two sets of inscribed planetary gear mechanisms) that constitutes the differential rotation mechanism 143 as described above.

In the differential device D according to the embodiment of the disclosure, the number of teeth $z_1$ of the first gear 9 (the first planetary gear 150), the number of teeth $z_2$ of the second gear 10 (the second planetary gear 151), the number of teeth $z_3$ of the input gear 7 (the input ring gear 146), and the number of teeth $z_4$ of the output gear 8 (the output sun gear 147) are set, so that the relationship that $1/(1-z_3/z_1 \times z_2/z_4) = -1$ is satisfied. When the respective numbers of teeth $z_1$, $z_2$, $z_3$, $z_4$ are numerical values as indicated in parentheses in FIG. 11, as in the above example, $$1/(1-z_3/z_1 \times z_2/z_4) = 1/\{1-(15/10) \times (16/12)\} = -1,$$

and the above relationship is satisfied.

The term "$1/(1-z_3/z_1 \times z_2/z_4)$" in the above expression is the reciprocal of the ratio of the rotational speed of the input gear 7 (the input ring gear 146) to the rotational speed of the carrier 145, and is the speed reduction ratio of the differential rotation mechanism 143 (the composite planetary gear mechanism) that takes account of the rotational direction (the speed reduction ratio to which the negative sign is given means that the rotational direction of the carrier 145 is opposite to the rotational direction of the input gear 7 (the input ring gear 146)). Thus, since the speed reduction ratio of the differential rotation mechanism 143 is "−1", the carrier 145 rotates at equal speed in the reverse rotational direction, relative to the input gear 7 (the input ring gear 146) and the output gear 8 (the output sun gear 147), when the first drive shaft 141 and the second drive shaft 142 rotate differentially. Namely, the first drive shaft 141 and the second drive shaft 142 rotate at equal speed relative to each other, in the opposite directions. Accordingly, with the differential device D according to the embodiment of the disclosure, it is possible to equally distribute and transmit the drive torque applied to the torque input member 144 (the differential ring gear 148) to the first drive shaft 141 and the second drive shaft 142, while permitting differential rotation of the first drive shaft 141 and the second drive shaft 142.

Thus, the differential device D according to the embodiment of the disclosure has a principal portion substantially constituted by two sets of inscribed planetary gear mechanisms. The inscribed planetary gear mechanism has a simple structure using no pinions. The differential device D of this embodiment distributes and transmits the drive torque applied from the power source, to the first drive shaft 141 and the second drive shaft 142. At the same time, the differential device D permits differential rotation of the first drive shaft 141 and the second drive shaft 142, and absorbs a difference in the rotational speed between the first drive shaft 141 and the second drive shaft 142. Accordingly, the differential device D of the embodiment provides the differential mechanism 140 (open differential) that is compact in size, and is simple in structure.

The differential device D according to the embodiment of the disclosure may provide a "center differential mechanism", or a "differential mechanism for the right and left wheels" having the function of torque vectoring, by using the differential rotation mechanism 123 shown in FIG. 10, or the differential rotation mechanism 143 shown in FIG. 11, for example, in place of the differential rotation mechanism 3 as described above.

Figure 12:
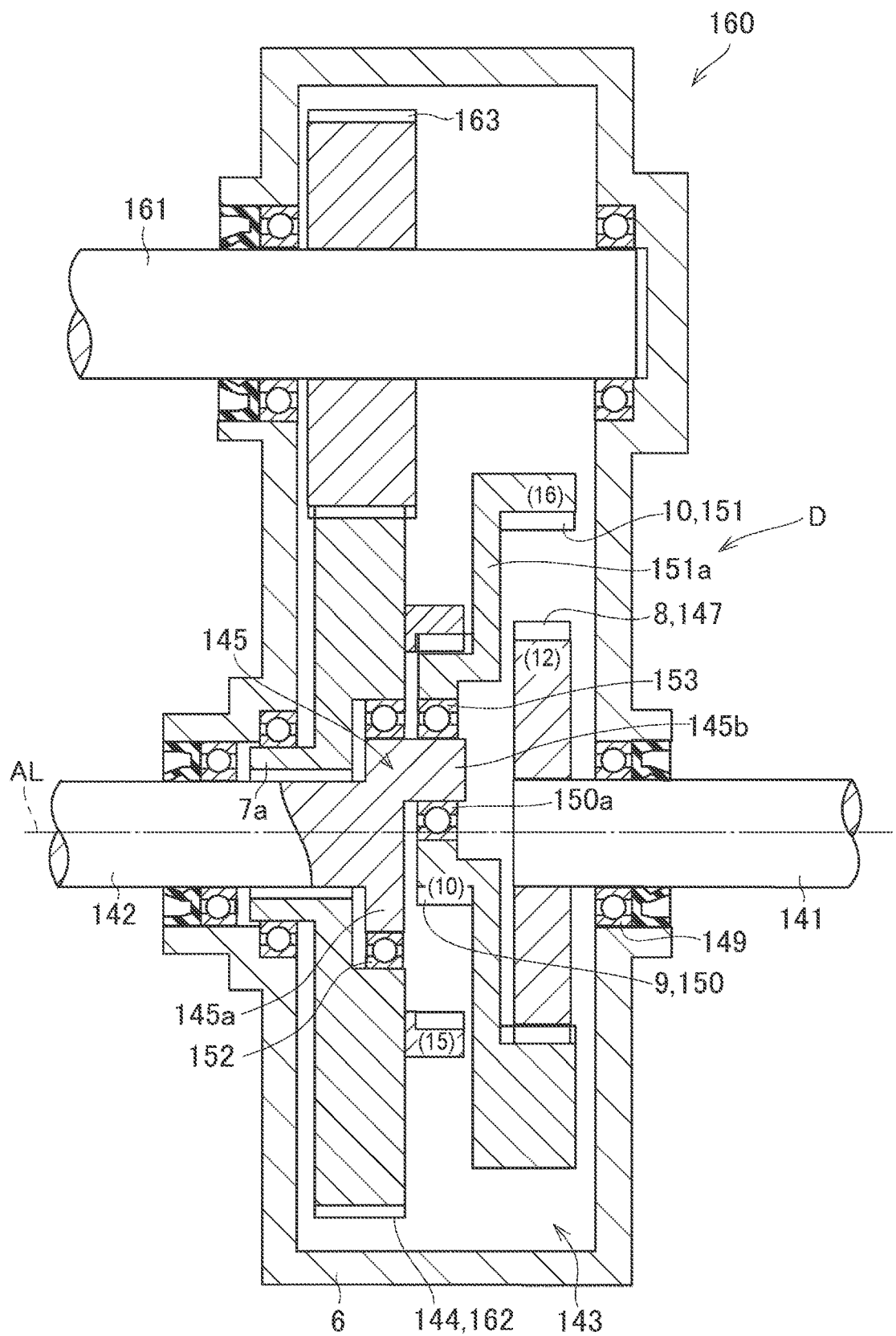
FIG. 12 is a view illustrating another example of a vehicular differential device of the disclosure, and showing an embodiment in which the vehicular differential device of the type shown in FIG. 11 provides a "center differential"

For example, a differential device D shown in FIG. 12 uses the differential rotation mechanism 143 shown in FIG. 11, to provide a center differential mechanism 160 installed on a four-wheel-drive vehicle. In the embodiment shown in FIG. 12, the first drive shaft 141 and second drive shaft 142 of the differential device D are disposed on the same axis to be longitudinally opposed to each other in the overall length direction (the lateral direction in FIG. 12) of the vehicle (not shown). Also, an output shaft (propeller shaft) 161 of a given power source is disposed in parallel with the overall length direction of the vehicle. Accordingly, the output shaft 161 is disposed in parallel with the first drive shaft 141 and second drive shaft 142.

Also, in the embodiment shown in FIG. 12, a differential ring gear 162 that is the torque input member 144 is a large-diameter "externally toothed gear". The differential ring gear 162 meshes with a drive gear 163 provided on the output shaft 161. The drive gear 163 is an "externally toothed gear" having the smaller diameter than the differential ring gear 162. Accordingly, the drive gear 163 and the differential ring gear 162 constitute a final reduction gear (final gear) of the vehicle.

Figure 13:
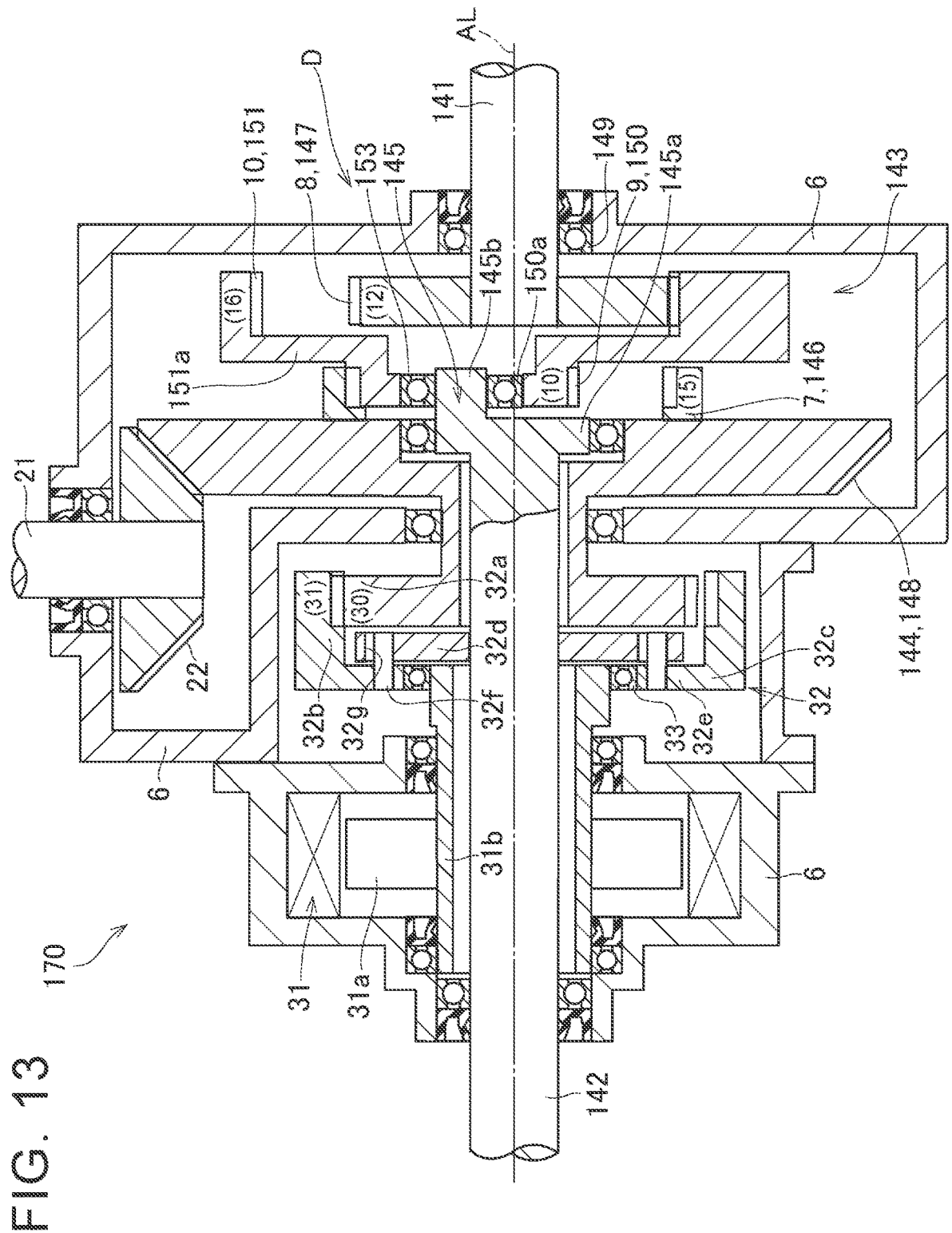
FIG. 13 is a view illustrating another example of a vehicular differential device of the disclosure, and showing an embodiment in which the vehicular differential device of the type shown in FIG. 11 is combined with a "control actuator", to provide a "differential mechanism for the right and left wheels" having the torque vectoring function.

A differential device D shown in FIG. 13 uses the differential rotation mechanism 143 shown in FIG. 11, to provide a differential mechanism 170. In the embodiment shown in FIG. 13, the first drive shaft 141 and second drive shaft 142 of the differential device D are disposed on the same axis, to be laterally opposed to each other in the vehicle width direction (the lateral direction in FIG. 13) of the vehicle (not shown). Also, the control motor 31 is provided as a "control actuator", as in the embodiment shown in FIG. 2. The differential device D shown in FIG. 13 provides a differential mechanism 170 for a vehicle having the function of torque vectoring, by combining the control motor 31 with the differential rotation mechanism 143.

In each of the above embodiments, bearings that rotatably support the respective shafts and gears, seal members that keep the interior of the case in a liquid-tight state, etc. are not particularly described. However, the bearings and seal members are placed as indicated by the corresponding symbols in each of the foregoing drawings.

What is claimed is:

1. A vehicular differential device comprising:
 a first drive shaft and a second drive shaft that are disposed on a same rotation axis, and are rotatable relative to each other;
 a differential rotation mechanism configured to permit differential rotation of the first drive shaft and the second drive shaft; and
 a torque input member disposed on the rotation axis and configured to receive drive torque from a given power source, the drive torque being distributed and transmitted to the first drive shaft and the second drive shaft in the vehicular differential device,
 wherein the differential rotation mechanism comprises an input gear that is disposed on the rotation axis, and rotates as a unit with the torque input member; an output gear that is disposed on the rotation axis, and rotates as a unit with the first drive shaft; a first gear and a second gear that are disposed on a same axis; and a carrier that is disposed on the rotation axis, and supports the first gear and the second gear such that the first gear and the second gear are rotatable about the axis of the first gear and the second gear and are revolvable about the rotation axis as a unit, the carrier being configured to rotate as a unit with the second drive shaft,
 wherein the input gear and the first gear mesh with each other, and the output gear and the second gear mesh with each other,
 wherein a gear ratio between the input gear and the first gear is different from a gear ratio between the output gear and the second gear,
 wherein when a rotational speed of the first drive shaft is equal to a rotational speed of the second drive shaft, the drive torque is equally transmitted to the first drive shaft and the second drive shaft,
 wherein when the first drive shaft and the second drive shaft perform differential rotation, the first drive shaft and the second drive shaft are rotated relative to each other in opposite directions, and wherein where $z_1$ denotes the number of teeth of the first gear, $z_2$ denotes the number of teeth of the second gear, $z_3$ denotes the number of teeth of the input gear, and $z_4$ denotes the number of teeth of the output gear, a relationship that $-2<1/(1-z_3/z_1 \times z_2/z_4)<-1$ is satisfied.

2. The vehicular differential device according to claim 1, wherein:
the input gear is a first sun gear that is an externally toothed gear;
the output gear is a second sun gear that is an externally toothed gear;
the first gear is a first pinion that revolves along an outer periphery of the first sun gear while meshing with the first sun gear; and
the second gear is a second pinion that revolves along an outer periphery of the second sun gear while meshing with the second sun gear.

3. The vehicular differential device according to claim 2, wherein an outside diameter of the first sun gear is larger than an outside diameter of the second sun gear.

4. The vehicular differential device according to claim 2, wherein at least one gear pair of a first gear pair of the first sun gear and the first pinion, and a second gear pair of the second sun gear and the second pinion, comprises a pair of helical gears.

5. The vehicular differential device according to claim 2, the vehicular differential device being installed on a vehicle having right and left drive wheels arranged in a vehicle width direction, along with a drive motor that generates the drive torque as the given power source, the first drive shaft and the second drive shaft being disposed to be opposed to each other in the vehicle width direction, the vehicular differential device further comprising:
a first speed reduction mechanism that is disposed between the first drive shaft, and a first axle to which one of the right and left drive wheels is connected, the first speed reduction mechanism being configured to amplify torque of the first drive shaft, and transmit the torque to the first axle; and
a second speed reduction mechanism that is disposed between the second drive shaft, and a second axle to which the other of the right and left drive wheels is connected, the second speed reduction mechanism being configured to amplify torque of the second drive shaft, and transmit the torque to the second axle,
wherein the differential rotation mechanism, the drive motor, the first speed reduction mechanism, and the second speed reduction mechanism are disposed on the rotation axis.

6. The vehicular differential device according to claim 5, wherein:
the drive motor has a rotor having a hollow structure; and
the differential rotation mechanism is placed in a hollow portion of the rotor, to be incorporated in the drive motor.

7. The vehicular differential device according to claim 1, wherein:
the input gear is a first ring gear that is an internally toothed gear;
the output gear is a second ring gear that is an internally toothed gear;
the first gear is a first pinion that is an externally toothed gear that revolves along an inner periphery of the first ring gear while meshing with the first ring gear; and
the second gear is a second pinion that is an externally toothed gear that revolves along an inner periphery of the second ring gear while meshing with the second ring gear.

8. The vehicular differential device according to claim 1, the vehicular differential device being installed on a vehicle having right and left drive wheels arranged in a vehicle width direction, wherein:
the first drive shaft transmits torque between one of the right and left drive wheels, and the output gear;
the second drive shaft transmits torque between the other of the right and left drive wheels, and the carrier; and
the first drive shaft and the second drive shaft are disposed to be opposed to each other in the vehicle width direction.

9. The vehicular differential device according to claim 1, the vehicular differential device being installed on a four-wheel-drive vehicle having front and rear drive wheels arranged in an overall length direction, wherein:
the first drive shaft transmits torque between one of the front and rear drive wheels and the output gear;
the second drive shaft transmits torque between the other of the front and rear drive wheels and the carrier; and
the first drive shaft and the second drive shaft are disposed to be opposed to each other in the overall length direction.

10. The vehicular differential device according to claim 1, further comprising a control actuator that generates control torque that is different from the drive torque, wherein:
the control actuator is connected to the torque input member and the second drive shaft such that power is transmittable between the control actuator, and the torque input member and the second drive shaft;
the differential rotation mechanism rotates the first gear and the second gear relative to each other in opposite directions when the control torque is applied to the second drive shaft; and
a distribution of the drive torque transmitted from the torque input member to the first drive shaft and the drive torque transmitted from the torque input member to the second drive shaft is controlled by controlling the control torque.

11. The vehicular differential device according to claim 10, wherein the control actuator is a control motor, or an electromagnetic brake of excitation operation type, or an electric brake.

12. The vehicular differential device according to claim 10, further comprising a speed reduction mechanism for control provided between the control actuator, and the differential rotation mechanism and the second drive shaft, wherein:
the speed reduction mechanism for control comprises a sun gear connected to the differential rotation mechanism, via the torque input member, a planetary gear that revolves about the rotation axis, while meshing with the sun gear, a revolution support carrier that supports the planetary gear, and an output plate connected to the second drive shaft;
the revolution support carrier supports revolving motion of the planetary gear, and rotates as a unit with a control torque output shaft through which the control actuator generates the control torque;
the output plate converts the revolving motion of the planetary gear into rotary motion of the second drive shaft; and a speed reduction ratio of an inscribed planetary gear mechanism including the sun gear and the planetary gear is equal to the number of teeth of the planetary gear.

13. The vehicular differential device according to claim 10, further comprising a speed increasing planetary gear mechanism having a speed increasing sun gear, a speed increasing carrier, and a speed increasing ring gear; and
a speed reducing planetary gear mechanism having a speed reducing sun gear, a speed reducing carrier, and a speed reducing ring gear, wherein:
the speed increasing planetary gear mechanism and the speed reducing planetary gear mechanism are disposed on the rotation axis;
the speed increasing sun gear is irrotatably fixed;
the speed increasing carrier rotates as a unit with the torque input member;
a rotational speed of the speed increasing ring gear increases relative to a rotational speed of the speed increasing carrier, when the speed increasing carrier rotates;
the speed reducing ring gear is connected to the speed increasing ring gear, and rotates as a unit with the speed increasing ring gear;
a rotational speed of the speed reducing carrier is reduced relative to a rotational speed of the speed reducing ring gear; and
the speed reducing sun gear rotates as a unit with a control torque output shaft through which the control actuator generates the control torque, and the speed reducing sun gear rotates relative to the torque input member when the first drive shaft and the second drive shaft rotate at equal speed in a same direction to corotate with the torque input member.

14. The vehicular differential device according to claim 13, further comprising a speed reduction mechanism for control provided between the control actuator, and the differential rotation mechanism and the second drive shaft, wherein:
the speed reduction mechanism for control comprises a first sun gear that rotates as a unit with the torque input member, a second sun gear that is disposed on the rotation axis, and rotates as a unit with the second drive shaft, a first pinion that meshes with the first sun gear, a second pinion that meshes with the second sun gear, and a carrier that is disposed on the rotation axis, and supports the first pinion and the second pinion, such that the first pinion and the second pinion are respectively rotatable about axes of the first pinion and the second pinion and are revolvable about the rotation axis; wherein
the first sun gear and the second sun gear rotate relative to each other;
the first pinion and the second pinion rotate as a unit in a self-rotating direction;
the carrier is configured to receive control torque of the control actuator, via the speed reducing planetary gear mechanism; and a gear ratio of a gear pair of the first sun gear and the first pinion is different from a gear ratio of a gear pair of the second sun gear and the second pinion.

15. A vehicular differential device comprising:
a first drive shaft and a second drive shaft that are disposed on a same rotation axis, and are rotatable relative to each other;
a differential rotation mechanism configured to permit differential rotation of the first drive shaft and the second drive shaft; and
a torque input member disposed on the rotation axis and configured to receive drive torque from a given power source, the drive torque being distributed and transmitted to the first drive shaft and the second drive shaft in the vehicular differential device,
wherein the differential rotation mechanism comprises an input gear that is disposed on the rotation axis, and rotates as a unit with the torque input member; an output gear that is disposed on the rotation axis, and rotates as a unit with the first drive shaft; a first gear and a second gear that are disposed on a same axis; and a carrier that is disposed on the rotation axis, and supports the first gear and the second gear such that the first gear and the second gear are rotatable about the axis of the first gear and the second gear and are revolvable about the rotation axis as a unit, the carrier being configured to rotate as a unit with the second drive shaft,
wherein the input gear and the first gear mesh with each other, and the output gear and the second gear mesh with each other,
wherein a gear ratio between the input gear and the first gear is different from a gear ratio between the output gear and the second gear,
wherein when a rotational speed of the first drive shaft is equal to a rotational speed of the second drive shaft, the drive torque is equally transmitted to the first drive shaft and the second drive shaft,
wherein when the first drive shaft and the second drive shaft perform differential rotation, the first drive shaft and the second drive shaft are rotated relative to each other in opposite directions, and wherein:
the input gear is an input ring gear that is an internally toothed gear;
the output gear is an output sun gear that is an externally toothed gear;
the first gear is a first planetary gear that is an externally toothed gear that revolves along an inner periphery of the input ring gear while meshing with the input ring gear;
the second gear is a second planetary gear that is an internally toothed gear that revolves along an outer periphery of the output sun gear while meshing with the output sun gear; and
the first planetary gear and the second planetary gear are formed as a unit.

* * * * *